US011928921B1

(12) United States Patent
Brahmandam et al.

(10) Patent No.: US 11,928,921 B1
(45) Date of Patent: Mar. 12, 2024

(54) MACHINE-LEARNING PLATFORM FOR MARKETING PROMOTIONS DECISION MAKING

(71) Applicant: Gaming Analytics Inc., Novato, CA (US)

(72) Inventors: Kiran Brahmandam, San Rafael, CA (US); Krishnan Srinivasan, Chennai (IN); Boyue Shen, Albany, CA (US)

(73) Assignee: Gaming Analytics Inc., Novato, CA (US)

( * ) Notice: Subject to any disclaimer, the term of this patent is extended or adjusted under 35 U.S.C. 154(b) by 431 days.

(21) Appl. No.: 16/876,320

(22) Filed: May 18, 2020

Related U.S. Application Data

(63) Continuation-in-part of application No. 16/338,012, filed on Mar. 29, 2019, now abandoned, which is a continuation of application No. 16/028,865, filed on Jul. 6, 2018, now Pat. No. 10,311,670.

(60) Provisional application No. 62/849,186, filed on May 17, 2019, provisional application No. 62/530,131, filed on Jul. 8, 2017.

(51) Int. Cl.
*G07F 17/32* (2006.01)

(52) U.S. Cl.
CPC .......... *G07F 17/3234* (2013.01); *G07F 17/32* (2013.01)

(58) Field of Classification Search
CPC ......... A63F 9/24; G07F 17/32; G07F 17/3234
See application file for complete search history.

(56) References Cited

U.S. PATENT DOCUMENTS

| | | | | |
|---|---|---|---|---|
| 6,517,435 | B2 * | 2/2003 | Soltys | G07F 17/32 273/148 R |
| 7,803,047 | B1 * | 9/2010 | Green | G07F 17/32 463/16 |
| 8,417,715 | B1 * | 4/2013 | Bruckhaus | G06Q 10/04 705/26.1 |
| 10,311,670 | B2 * | 6/2019 | Brahmandam | G07F 17/3234 |
| 10,950,086 | B2 * | 3/2021 | Brahmandam | G07F 17/3234 |
| 2004/0024666 | A1 * | 2/2004 | Walker | G06Q 30/0218 705/32 |
| 2006/0199649 | A1 * | 9/2006 | Soltys | G06Q 10/0639 463/47 |
| 2006/0205489 | A1 * | 9/2006 | Carpenter | G07F 17/3241 463/29 |
| 2006/0217194 | A1 * | 9/2006 | Walker | G07F 17/3283 463/29 |
| 2008/0138773 | A1 * | 6/2008 | Lathrop | G07F 17/3234 434/72 |
| 2008/0261699 | A1 * | 10/2008 | Topham | G07F 17/32 463/42 |
| 2009/0054139 | A1 * | 2/2009 | Anderson | G07F 17/3234 463/31 |
| 2009/0055205 | A1 * | 2/2009 | Nguyen | G07F 17/3241 348/169 |

(Continued)

*Primary Examiner* — Chase E Leichliter
(74) *Attorney, Agent, or Firm* — Frost Brown Todd LLP

(57) ABSTRACT

A platform for providing projections, predictions, and recommendations for casino and gaming environments. The platform leverages machine learning and cognitive computing to determine and present casino promotions. The platform presents this information in a way which is natural and timely for casino operational executives to understand and act upon. The platform can optimize casino promotions based on player and casino analytics.

20 Claims, 27 Drawing Sheets

(56) References Cited

U.S. PATENT DOCUMENTS

| | | | | |
|---|---|---|---|---|
| 2009/0070081 | A1* | 3/2009 | Saenz | G07F 17/3227<br>703/2 |
| 2009/0170608 | A1* | 7/2009 | Herrmann | G07F 17/3237<br>463/42 |
| 2009/0172035 | A1* | 7/2009 | Lessing | G06Q 30/02 |
| 2010/0234104 | A1* | 9/2010 | Ruppert | G07F 17/3234<br>463/43 |
| 2011/0081961 | A1* | 4/2011 | Gagner | G07F 17/32<br>463/25 |
| 2011/0118007 | A1* | 5/2011 | Gururajan | G07F 17/3234<br>463/25 |
| 2011/0183732 | A1* | 7/2011 | Block | G06Q 50/34<br>463/1 |
| 2011/0281641 | A1* | 11/2011 | Weller | G07F 17/3255<br>463/25 |
| 2011/0294566 | A1* | 12/2011 | Cardno | G07F 17/32<br>463/25 |
| 2012/0040756 | A1* | 2/2012 | Moore, III | G06T 19/00<br>463/32 |
| 2012/0047090 | A1* | 2/2012 | Gunther | G06Q 40/06<br>705/36 R |
| 2014/0080588 | A1* | 3/2014 | Acres | G07F 17/3234<br>463/25 |
| 2015/0105162 | A1* | 4/2015 | Ruppert | G07F 17/32<br>463/42 |
| 2016/0342902 | A1* | 11/2016 | Pinckney | G06Q 30/02 |

* cited by examiner

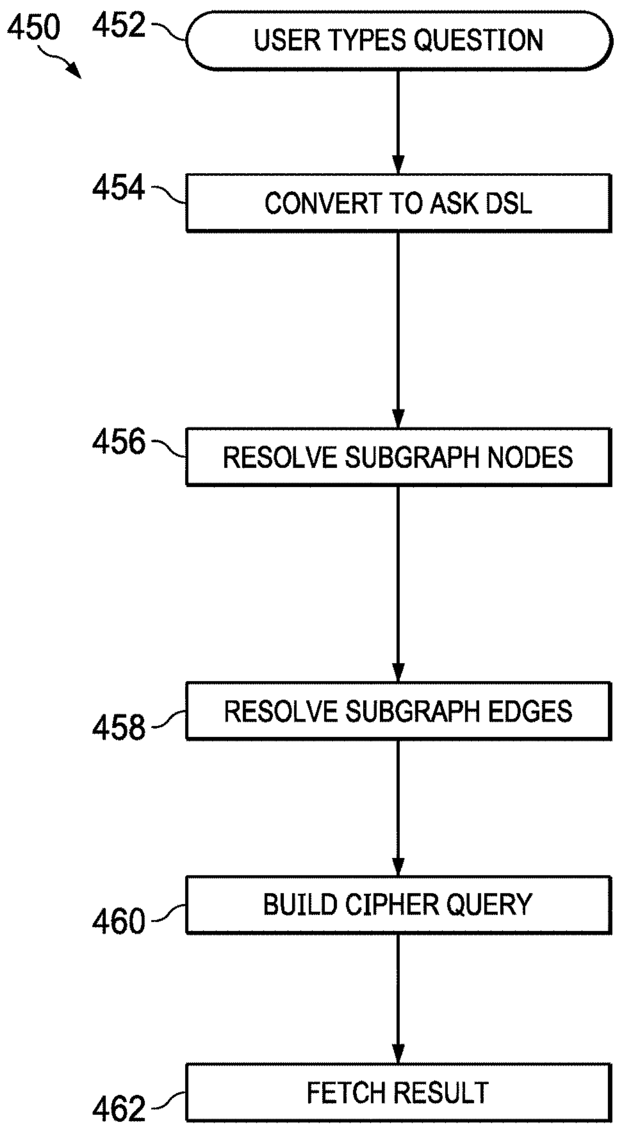

FIG. 4B

ALL SLOTS WITH NetWin GREATER THAN $10,000 THIS MONTH BY MANUFACTURER

```
query
.dimension("Slots")
.metric("assetID","netWin")
.predicate("netWin", "gt", 10,000)
.predicate("month", "eq", "2018/02")
.sortAsc("NetWin")
.groupBy ("manufacturer")
```

| NODE | PROPERTIES |
|---|---|
| ASSET | ID |
| GamePlay | NetWin |
| MANUFACTURER | NAME |
| MONTH | VALUE |

| START NODE | END NODE | EDGE |
|---|---|---|
| GamePlay | ASSET | ASSET_GAMEPLAY |
| ASSET | MANUFACTURER | ASSET_MANUFACTURED_BY |
| GamePlay | MONTH | MONTHLY_GAMEPLAY_SUMMARY |

```
MATCH (asset:Asset) - [-MANUFACTURED_BY] -> (manufacturer:Manufacturer)
MATCH (asset) - [:GAMEPLAY] -> (gameplay:GamePlay)
MATCH (month:Month) - [:MONTHLY_GAMEPLAY_SUMMARY] -> (gameplay)
WHERE month = '2018/02'
RETURN manufacturer.name, asset.id, gameplay.netWin
```

| MANUFACTURER | ASSET | NetWin |
|---|---|---|
| IGT | IGT0001 | $15,000 |
| BALLY | BAL0002 | $17,000 |

1050

INTERFACE

CHANGE ANALYSIS - HOW DID MY CHANGES PERFORM?

| Bank | Zone | Area | Change Day | Impact on Coin In (PUPD) | Impact on Net Win (PUPD) | Impact on Theoretical Win (PUPD) | Impact on Handle Pulls (PUPD) |
|---|---|---|---|---|---|---|---|
| 2018/01/02 | | | | | | | |
| ⊕ 142 | 6 | 1 | 2018/01/02 | -$34,695 | $16,782 | -$66 | 10,418 |
| 2018/12/27 | | | | | | | |
| ⊕ 44 | 6 | 1 | 2017/12/27 | -$49,767 | $2,656 | -$3,523 | 2,739 |
| ⊕ 142 | 6 | 1 | 2017/12/27 | -$48,535 | $9,030 | -$669 | 9,582 |
| 2018/12/19 | | | | | | | |
| ⊕ 82 | 6 | 1 | 2017/12/19 | -$108,737 | $60,760 | -$14,904 | -5.513 |
| ⊕ 89 | 2 | 1 | 2017/12/19 | $90,699 | $3,024 | $3,009 | -2,557 |
| ⊕ 143 | 6 | 1 | 2017/12/19 | -$13,435 | -$1,266 | -$872 | -2,000 |
| ⊕ 154 | 6 | 1 | 2017/12/19 | $112,137 | $7,199 | $3,192 | -3,050 |

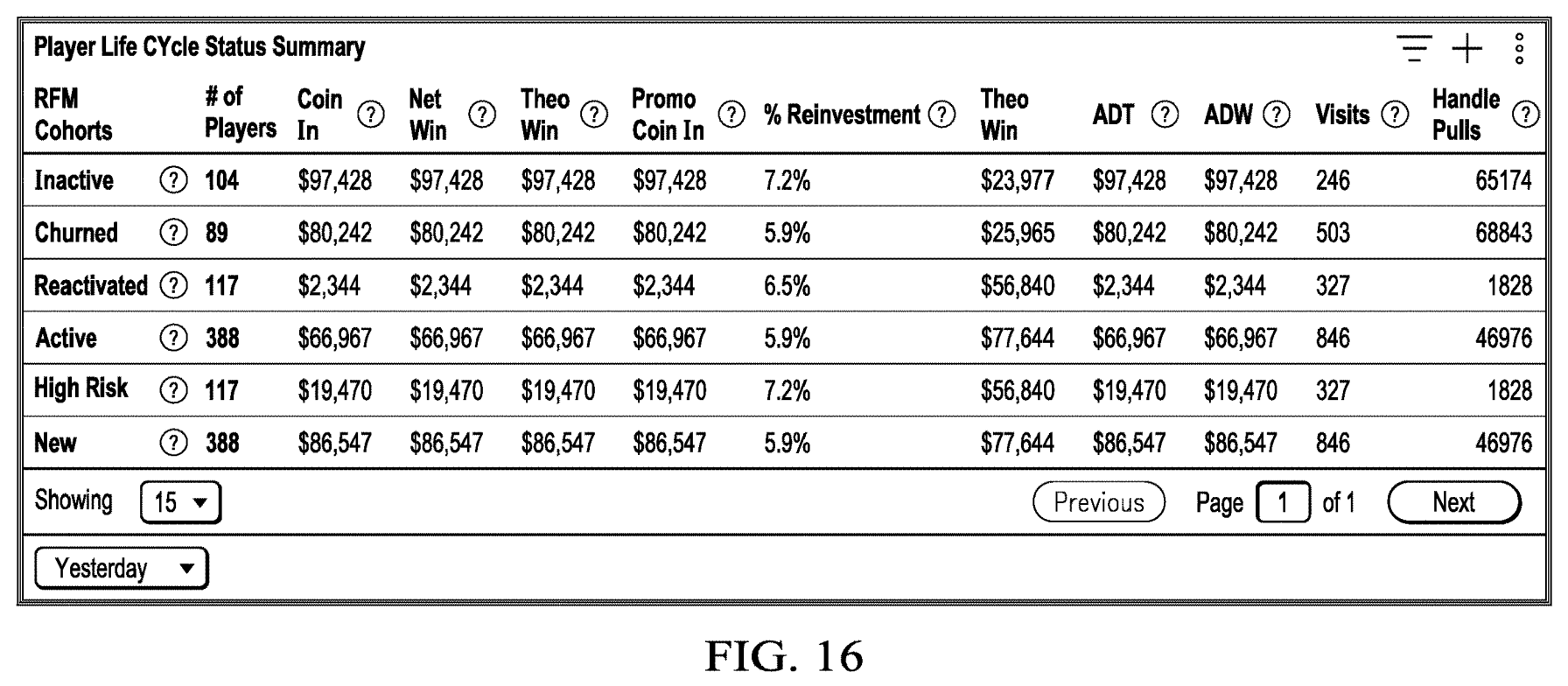

Player Life CYcle Status Summary

| RFM Cohorts | # of Players | Coin In | Net Win | Theo Win | Promo Coin In | % Reinvestment | Theo Win | ADT | ADW | Visits | Handle Pulls |
|---|---|---|---|---|---|---|---|---|---|---|---|
| Inactive | 104 | $97,428 | $97,428 | $97,428 | $97,428 | 7.2% | $23,977 | $97,428 | $97,428 | 246 | 65174 |
| Churned | 89 | $80,242 | $80,242 | $80,242 | $80,242 | 5.9% | $25,965 | $80,242 | $80,242 | 503 | 68843 |
| Reactivated | 117 | $2,344 | $2,344 | $2,344 | $2,344 | 6.5% | $56,840 | $2,344 | $2,344 | 327 | 1828 |
| Active | 388 | $66,967 | $66,967 | $66,967 | $66,967 | 5.9% | $77,644 | $66,967 | $66,967 | 846 | 46976 |
| High Risk | 117 | $19,470 | $19,470 | $19,470 | $19,470 | 7.2% | $56,840 | $19,470 | $19,470 | 327 | 1828 |
| New | 388 | $86,547 | $86,547 | $86,547 | $86,547 | 5.9% | $77,644 | $86,547 | $86,547 | 846 | 46976 |

Showing 15 Previous Page 1 of 1 Next

Yesterday

FIG. 16

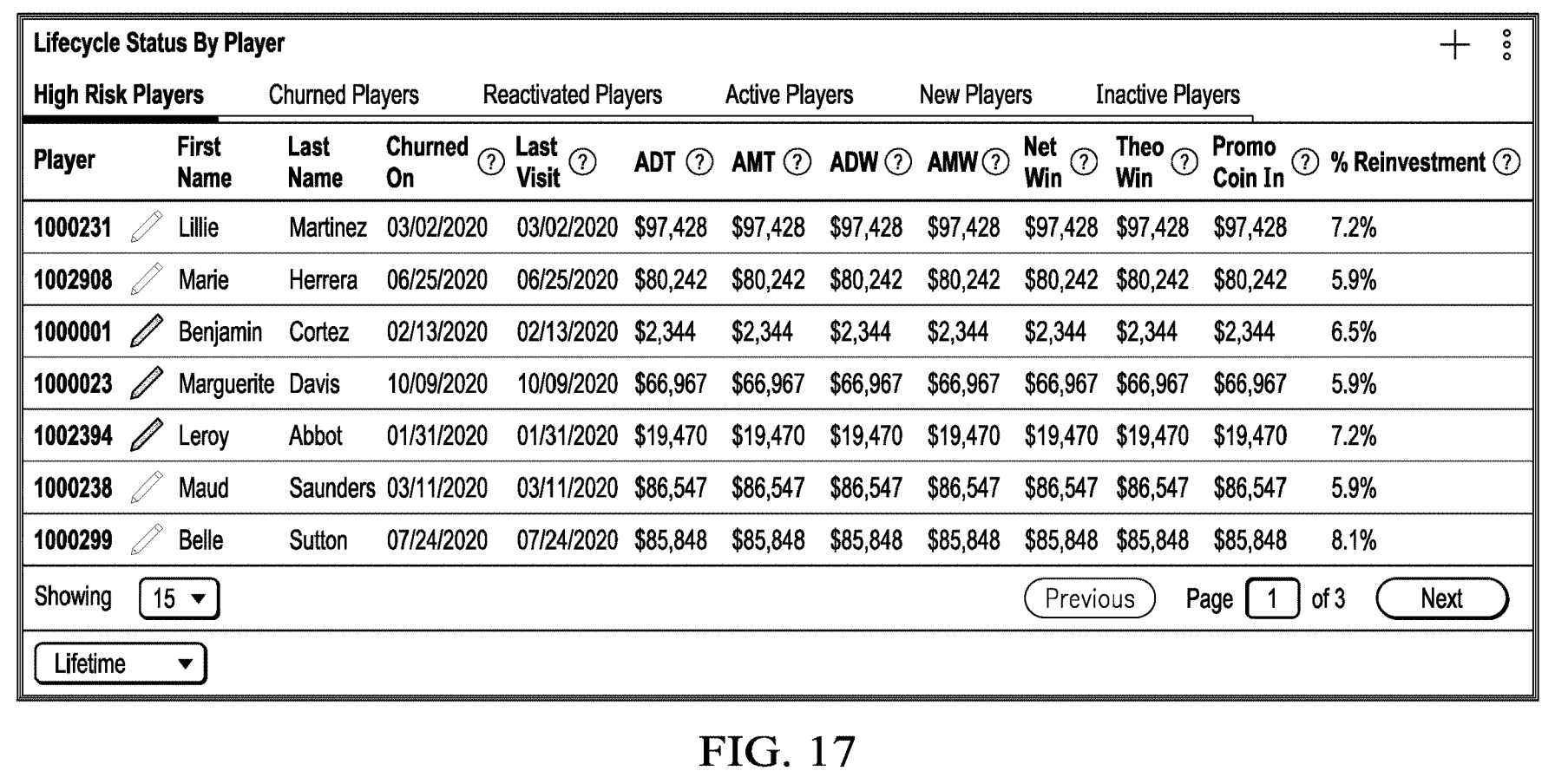

Lifecycle Status By Player

High Risk Players | Churned Players | Reactivated Players | Active Players | New Players | Inactive Players

| Player | First Name | Last Name | Churned On ? | Last Visit ? | ADT ? | AMT ? | ADW ? | AMW ? | Net Win ? | Theo Win ? | Promo Coin In ? | % Reinvestment ? |
|---|---|---|---|---|---|---|---|---|---|---|---|---|
| 1000231 | Lillie | Martinez | 03/02/2020 | 03/02/2020 | $97,428 | $97,428 | $97,428 | $97,428 | $97,428 | $97,428 | $97,428 | 7.2% |
| 1002908 | Marie | Herrera | 06/25/2020 | 06/25/2020 | $80,242 | $80,242 | $80,242 | $80,242 | $80,242 | $80,242 | $80,242 | 5.9% |
| 1000001 | Benjamin | Cortez | 02/13/2020 | 02/13/2020 | $2,344 | $2,344 | $2,344 | $2,344 | $2,344 | $2,344 | $2,344 | 6.5% |
| 1000023 | Marguerite | Davis | 10/09/2020 | 10/09/2020 | $66,967 | $66,967 | $66,967 | $66,967 | $66,967 | $66,967 | $66,967 | 5.9% |
| 1002394 | Leroy | Abbot | 01/31/2020 | 01/31/2020 | $19,470 | $19,470 | $19,470 | $19,470 | $19,470 | $19,470 | $19,470 | 7.2% |
| 1000238 | Maud | Saunders | 03/11/2020 | 03/11/2020 | $86,547 | $86,547 | $86,547 | $86,547 | $86,547 | $86,547 | $86,547 | 5.9% |
| 1000299 | Belle | Sutton | 07/24/2020 | 07/24/2020 | $85,848 | $85,848 | $85,848 | $85,848 | $85,848 | $85,848 | $85,848 | 8.1% |

Showing 15 ▼ Previous Page 1 of 3 Next

Lifetime ▼

FIG. 17

FROM FIG. 19A

MACHINE-LEARNING PLATFORM FOR MARKETING PROMOTIONS DECISION MAKING

CROSS-REFERENCE TO RELATED APPLICATION

This application claims the benefit of U.S. Patent Application Ser. No. 62/849,186, filed on May 17, 2019, entitled MACHINE-LEARNING PLATFORM FOR OPERATIONAL DECISION MAKING, and is a continuation-in-part of U.S. patent application Ser. No. 16/388,012, filed on Apr. 18, 2019, entitled MACHINE-LEARNING PLATFORM FOR OPERATIONAL DECISION MAKING, which is a continuation of U.S. patent application Ser. No. 16/028,865, filed on Jul. 6, 2018, entitled MACHINE-LEARNING PLATFORM FOR OPERATIONAL DECISION MAKING, which claims the benefit of U.S. Patent Application Ser. No. 62/530,131, filed on Jul. 8, 2017, entitled MACHINE-LEARNING PLATFORM FOR OPERATIONAL DECISION MAKING, the disclosures of which are incorporated herein by reference in their entirety.

BACKGROUND

Gaming machines, such as slot machines, poker machines, and the like, provide a source of revenue for gaming establishments. A large gaming casino typically employs thousands of gaming machines that can be operated simultaneously. Currently, casino floors include a wide variety of electronic gaming machines, such as video slot machines, poker machines, reel slot machines and other gaming machines. A central line of questioning for casino operational executives is ensuring the correct balance, or mix, of machines exist on the floor, according to some natural division like manufacturer or cabinet type. This has historically been done by comparing percentage contribution to some important metric like net win for each category within the division to the percentage of machines within that category. The most common action based on this information is to add additional machines from the category with the highest ratio and removing machines from the category with the lowest. This approach, however, suffers from the implicit assumption that demand for machines of that category is relatively linear in the size of the category, which is often not the case for various classes of machines and play. Thus, while casino operators have access to a wide array of information from various data sources, the challenge is to create context and insights from this information.

Current offerings that are designed to assist casino operators with operational decisioning focus on data and not context or insights. Further, future machine performance of specific machine key performance indicators (KPIs) is most commonly predicted with a linear trend line, generated through a simple statistical process like linear regression on recent historical performance. More advanced methods might utilize basic time series methods to remove seasonality before regressing, but these approaches are extremely simplistic and often yield poor predictions.

Additionally, casino operators typically engage in marketing and promotional efforts. It is often imperative for businesses to develop effective marketing strategies to connect with their clients. By sending promotions, businesses can recruit new clients, keep loyal clients, and regain lost clients. However, effective marketing and promotional efforts are often not directed to players. Instead, time and resources are spent on recruiting and retention programs that fail to deliver the desired results.

BRIEF DESCRIPTION OF THE DRAWINGS

The present disclosure will be more readily understood from a detailed description of some example embodiments taken in conjunction with the following figures:

FIGS. 4A-4B depict example workflow in accordance with the present disclosure.

FIG. 16 depicts an example interface presented by a gaming analytics computing system showing metrics by player status classification in accordance with one non-limiting embodiment.

FIG. 17 depicts an example interface presented by a gaming analytics computing system showing players classified by status in accordance with one non-limiting embodiment.

DETAILED DESCRIPTION

Figure 1:
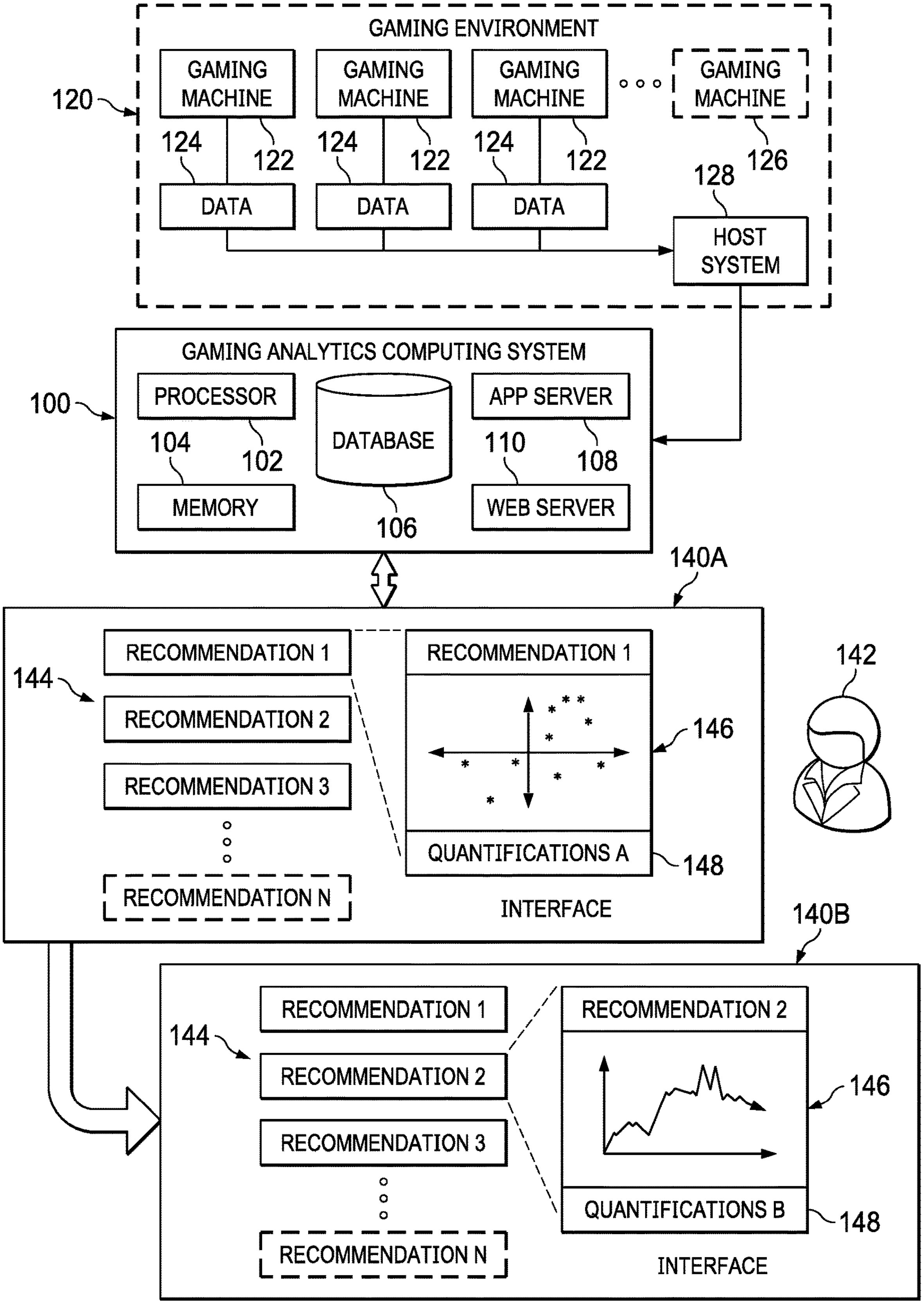
FIG. 1 depicts a gaming analytics computing system in communication with a plurality of gaming machines in accordance with the present disclosure.

Various non-limiting embodiments of the present disclosure will now be described to provide an overall understanding of the principles of the structure, function, and use of a machine-learning driven platform for operational decision making as disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Described herein are example embodiments of computer-based systems and methods that allow casino operators, and other entities in the gaming space, to bring many data sources into an artificial intelligence engine. Once ingested, the data can be analyzed to provide insights and predictive analytics. Based on the predictive analytics, operational recommendations can be provided by the system that allows casino operators to improve service to players, drive loyalty, increase profits, and improve cost savings. In accordance with various examples, an intuitive interface that is supported by natural language processing and artificial intelligence is provided to users. Based on the predictive analytics, operational recommendations can be provided to users, such as gaming machine location, gaming machine type, gaming machine denomination, and so forth. Moreover, such operational recommendations can provide insights with regard to marketing and promotional efforts.

Generally, the present disclosure provides an analytic platform that is intelligent, flexible, and driven by deep learning and machine learning. The platform can be accessed by a natural language query interface. The platform described herein can not only provide full reporting capabilities but also can provide projections, predictions, insights and recommendations designed to best improve operational key performance indicators. Further, information can be presented to users in a way that is natural and timely for users, such as casino operational executives, to understand and act upon.

The analytic platform described herein can predict and utilize any of a variety of metrics, alone or in combination, to provide operational decision making. For example, in accordance with some embodiments, predicted theoretical win, rather than net win, can be used as a target metric for operational decision making. Further, in accordance with the present disclosure, gaming machine performance can be optimized on a machine-by-machine basis. Optimization can include identifying which gaming machine to replace, as well as other operational changes, such as changes to a game, a denomination, or a gaming machine location within a gaming environment. Beneficially, such optimization can be implemented through one or more actionable recommendations provided by the platform, with the recommendations supported by quantifiable data.

As described in more detail below, optimizing floor performance on a factor-by-factor basis (by denomination, manufacturer, etc.) can be predicted in accordance with the present disclosure, thereby generating actionable recommendations with quantified and justified value. In some cases, outside/third-party data sources are utilized to further enhance and inform predictions. Additionally or alternatively, streaming, real-time data can be used to assist in identifying real-time actions which can be taken to optimize short-term performance.

The platform described herein can include a natural language query interface. Associated machine learning algorithms can utilize a database to retrieve appropriate data based on inquiries. In some embodiments, the database is a relational database that can be managed by a database management system. In some embodiments, the database is a graph database, with data stored as nodes and edges. The nodes can represent real-world entities, such as gaming machines, players, game play, and so forth, which contain attributes. Edges of the graph database represent the relationship between nodes. With regard to queries submitted to the platform, the machine learning algorithms can infer the entities about which the query is referring as well as the user's intent behind requesting the query. With these known entities and intent, the database can then be queried and traversed until the nodes and edges satisfying the intent with respect to the entities are reached, and the associated data are retrieved.

With the relevant data in hand the platform can utilize machine learning to select the appropriate dynamic visualization scheme and present the result to the user. Over time, as interactions with the platform increase, it can dynamically learn associations between entities and begins to understand implications of intent and entities to serve not only the requested results, but also related results and to offer related questions to fully contextualize the information.

Through strategic choice of visualization methods, data from the platform can be conveyed to a user in visually simplistic techniques, while still delivering full and contextualized information. While much of the information being explored by users through interactions with the platform may be in the form of time series, other data types (e.g., KPI's over disparate time windows) may be better conveyed with other forms of visualizations. As such, the platform can select an optimal visualization type from a set of visualization options. However, just as important as the data in question, are the relationships that exist between different datasets. As such, in accordance with various embodiments, the platform can utilize technology to intelligently identify nearby relationships and quantify their relevance, then categorize them by type and present this information in an intuitive navigation section. The user can then dynamically change between datasets to explore relationships, patterns, correlations, and anomalies.

As is to be appreciated, platforms in accordance with the present disclosure can utilize not only machine-level data such as amount bet and handle pulls, but also player-level data such as which players are playing which machines and how players move on the floor. Additionally, external data about carded players such as shopping habits, hobby preferences, annual income, and estimated discretionary spending budget, as well as external information such as weather, inflation, gas prices, events, concerts, road conditions and so forth, can be used to determine recommendations for floor yield optimization.

Further, the platform described herein can learn user patterns and tendencies, and understand the structure and composition of data objects. The platform can track behavior as a user navigates throughout the application and utilize machine learning to understand the intent behind the navigation and, in answering future queries, also present the information relevant to the next few questions which are likely to be asked. The platform can present this list of predicted next-questions in the form of button prompts, after applying a filter to ensure sufficient diversity of questions (e.g. so that questions like both "Which machines are winners today?" and "What are my top machines today" are not both presented as possible next questions). The platform can also take the associations learned from the historical navigational sequences and the nature of the questions the user has historically entered to automatically generate insights about the data currently being displayed, to contextualize the information and allow the user a complete multi-dimensional view of their operations. For example, if a user asks "How are my machines doing today?" they may be presented with a scatterplot of machine performance for the day relative to house average, but may also be presented with insights about a disproportionate amount of revenue coming from a certain class of machine.

As described in more detail below, platforms in accordance with the present disclosure can propose recommendations for actions an operations team can take, and can quantify the value of these actions. The platform can issue a top-level expected value in terms of expected net win uplift due to the implementation of the recommendation, but can also understand there are economic costs to implementing many types of changes. The platform can utilize extensive domain knowledge of the economics of the gaming industry to set default values for calculating the fully loaded cost/value of these recommendations, but can also allow users who know specific values their organization can expect for various parameters to override with their own numbers. In doing so the platform can give a fully contextualized quantification of the recommendation as both an estimate of lift to key metrics like net win per unit per day, and a discounted cash flow and income analysis. These processes and considerations are taken into account and executed any time a recommendation or projection is made which would require a change in the fundamental configuration of the gaming floor, including for example the movement or replacement of machines.

In accordance with another aspect of the presently disclosed platform, recommendations can be presented along with a full economic analysis underlying the recommendation. Factors which are not endogenous to the predictions of future performance, for example the amount an organization can be expected to pay for a new machine of a specific type or the organization's weighted cost of capital, are presented as either industry-average defaults or whatever settings the user or organization have configured as a part of their profile. Exogenous variables (those which are not predicted by the model, but rather incorporated as industry defaults or user overrides), like weighted cost of capital, are also adjustable in the justification analysis, which allows a user to easily examine the expected bottom-line value of implementing a recommendation under various hypothetical scenarios. This paradigm can allow a user to exercise judgment and incorporate expectations about future economic conditions to utilize the results of the platform predictions to their full value.

The platform can be used to predict optimal mixes of gaming machines on a gaming floor. Along these lines, the platform disclosed herein can utilize a data driven approach based around the cross-occupancy elasticities of supply (the sensitivity of occupancy rates to changes in supply, or quantity, of machines) to estimate the marginal value of adding or removing arbitrary numbers of machines of arbitrary types. Elasticities can be estimated across the full range of machine quantities which have ever been present on the floor, and historical observations are systematically up- or down-weighted based on similarity of floor conditions (in particular, number of machines of each category) at the time to current conditions. Using these elasticities, an optimal proportion of machines can be arrived at and the marginal value of making the requisite changes quantified. Further, since elasticities are not constant along the supply curve, the platform can intelligently throttle the number of recommendations it presents to a user at any given time to ensure a minimum confidence level is met on the quantified values of each recommendation. Once the recommended changes have been undertaken the model re-calibrates elasticities and re-calculates the optimal proportion, makes new recommendations, and in this way moves the distribution of machines on the floor consistently towards an optimum portfolio.

The platform in accordance with the present disclosure can utilize numerous models built around newly created quantities like game popularity and machine novelty, algorithms for estimating the value of locations on the floor independent of the machines that occupy them, and rigorous statistical normalization at multiple levels. These models can utilize machine learning techniques in accordance with the present disclosure along with deep learning in the form of long short-term memory recurrent neural networks to generate individual predictions of various metrics. A machine learning meta-model combines these various predictions to produce a final prediction for each metric. In some uses, the platform can predict and display a 95% confidence window, or other suitable percentage, which allows a user to understand the amount of risk and variance associated with a given prediction.

Neural networks can be used as a component of predicting future machine performance that relies on existing historical data to inform future predictions. For this reason they are not necessarily appropriate for comparing hypothetical machine performances, since no historical data exists for hypothetical machines. Accordingly, the platform in accordance with the present disclosure uses a combination of the other machine learning and statistical methodologies to predict an existing machine's performance to generate predictions for both the current machine in a specific location, and for other hypothetical machines and configurations which might be candidates for replacement.

Figure 6:
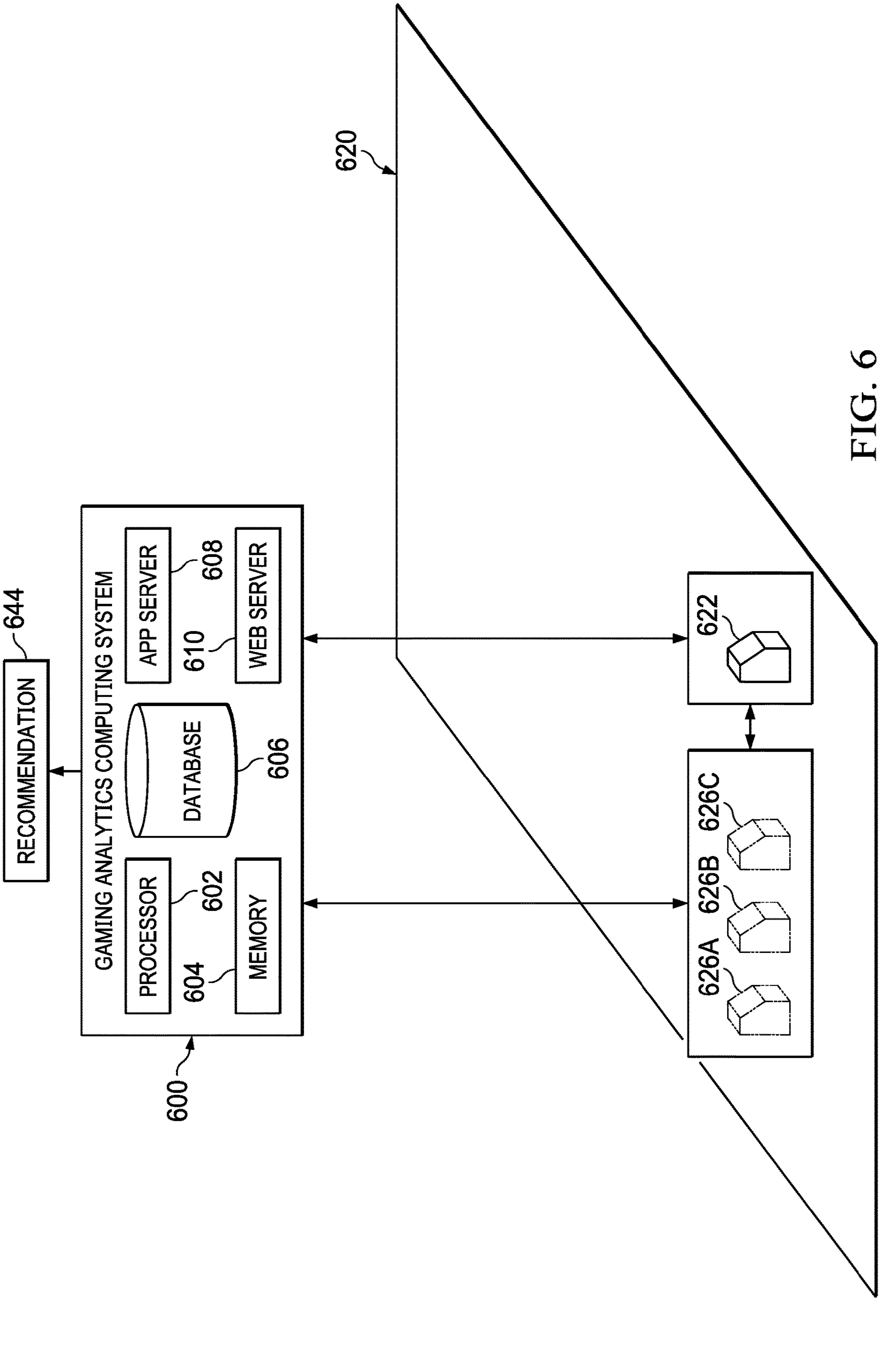

To recommend a machine replacement recommendation or game title change recommendation, the platform can utilize hypothetical machine performance predictions to generate a comparison of the current machine against the new hypothetical machine. For example, the generation of both predicted marginal increase in various metrics and of confidence levels associated with the predictions can be determined, all of which are returned to the user to inform the decision of whether to accept any machine replacement or game title change recommendations. Recommendations can be presented in context of projected change to key metrics, such as net win and amount bet on a daily basis, as well as expected net economic benefit over various future time periods. An example operational use case is schematically shown in FIG. 6 with an example interface shown in FIG. 9.

Moreover, similar to recommending machine replacements, the same algorithms can be utilized to test whether two or more machines should swap locations. The platform can generate predictions for future performance of both machines based on current and swapped locations, and if the economic thresholds for creating a recommendation are met under the hypothetically swapped configuration then the user is notified they should swap machines. An example operational use case is described in more detail below with regard to FIG. 5.

In accordance with various embodiments, the platform can utilize statistical methodologies for identifying outlier machines. Thus, in addition to analyzing data for the purposes of increasing top-line numbers like house net win and amount bet, the platform can utilize statistical and machine learning methods to identify fraud at both the machine and individual player level. In the event fraud is suspected, the platform can push notifications and supporting justifications as determined by the models to the user for further investigation, thus limiting risk to bottom line numbers.

The platform can also be used to predict gaming machine maintenance events and recommend operational actions based on the same. For instance, based on historical failure and servicing of various gaming machine hardware components, the platform can predict future hardware failures or issues. Based on these predictions, the platform can provide operational recommendations, which can include proactively servicing such hardware components in advance of failure. Example gaming machine hardware components can include, without limitation, bill validators, printers, card readers, among other mechanical or electromechanical aspects. Accordingly, by recommending predictive maintenance for gaming machines of a gaming environment, the platform can be used to reduce the likelihood of hardware component failure and the resulting costly operational downtime associated therewith.

The platform can utilize streaming data from the gaming floor to generate real-time information, insights, alerts, and recommendations for optimizing operations. Micro-models can be constructed that run on micro-batches of seconds, minutes, or other smaller periods of time, worth of data, and can constantly project the value of various actions the casino can take along with associated confidence levels. These models also can incorporate economic considerations to give projected fully-loaded values of implementing the recommendations, which together with the associated confidence levels allow the user to make fully informed decisions on whether to accept or reject the recommendation. These models can span the range of recommending promotional recommendations like free play, recommending when to launch games or competitions, among others.

The systems and methods in accordance with the present disclosure beneficially utilize highly granular knowledge of both machine parameters and machine performance. In some cases, with an understanding of each possible permutation of game combination available on the machine and wager size, and for each permutation, the long-run standard deviation of a game can be determined. Such determination can either be through a Volatility Index (VI) as provided on a par sheet, through an associated paytable which includes probabilities and payouts for each possible outcome, or other methods. Machine performance data, as outlined below, can be collected and segmented by each combination of game title and wager size. Each unique combination of game title and wager size is referred to herein as a "game combination."

With respect to machine measurements, below is example gaming machine data that can be utilized by the platform:

- Machine ID (unique)
- Game Combo
  - Manufacturer
  - Game Title
  - Denomination (i.e., Wager Size)
  - Long-Run Standard Deviation
  - Fees or Royalties, Associated Percentages, and Accounting Methods
    - In-House/Proprietary Progressive
    - Wide Area Progressive
    - Royalty
    - None
- Duration of Measurement Window
- Timestamp
  - Year, Month, Day, and any additional granularity available
  - Which point in the measurement window the timestamp corresponds to (beginning, end, etc.)
- Coin-in
- Coin-out
- Drop
- Jackpots paid out
- Hopper Fills
- Location/Placement Information, such as:
  - Area ID
  - Bank ID
  - Bank Shape
    - Rectangle
    - Linear
    - Arc
    - Tri-Pod
    - Round/Carousel
  - Location/Position ID Seat Type
- Middle Seat
- End Seat
- End Cap
- Round For the above metrics, and other quantities to follow, the terms are naturally extended to pertain exclusively to certain classes of play, where explicitly stated. For example, should a user be interested in the dynamics of a Player's Club or the performance of a marketing promotion, certain quantities like Coin In could be exclusively restricted to wagers placed by members in the Player's Club, or wagers which were funded with promotional dollars.

The systems and methods in accordance with the present disclosure can utilize one or of the following metrics in the decisioning described herein.

Actual Win: Coin In—[Coin Out+Jackpots Paid Out]

Meter Win: Drop—[Hopper Fills+Jackpots Paid Out]

Hold Percentage: Meter Win/Coin In

Actual Win Percentage: Actual Win/Coin In

Meter Win Percentage: Meter Win/Coin In

Handle Pulls: Coin In/Wager Size

Average Wager: For a fixed time window and specific machine with wager sizes $w_i$, if that machine has $h_i$ many handle pulls within that time window for each wager size then the average wager is defined as the quantity:

$$\text{Average Wager} = \frac{\sum_i w_i \cdot h_i}{\sum_i h_i} \quad \text{EQ. 1}$$

Expected Payout: For a game combination with potential payouts $w_i$ and associated probabilities pi, the Expected Payout is defined as the quantity:

$$\text{Expected Payout} = \sum_i w_i p_i \quad \text{EQ. 2}$$

Return to Player (RTP): Expected Payout/Wager Size

Par Percentage: 1—Return to Player

Theoretical Win: Par Percentage×Coin In

Machine Day: Operation of a machine at a fixed location for 24 continuous hours, or 1 full business day.

Occupancy: For each game combination i on a particular machine, assume an estimate of the number of handle pulls per minute $e_i$ when that specific game combination is being continuously played known. When the true number of handle pulls $h_i$ within a specific time window of length T minutes is known, then the occupancy of the machine over that time window can be defined to be the quantity:

$$\text{Occupancy} = \frac{1}{T}\sum_i \frac{h_i}{e_i} \quad \text{EQ. 3}$$

(Actual, Theoretical, Meter) Take-Home (Par, Win, Percentage): For machines with royalties or fees, Take-Home variants on metrics can be defined to be those metrics, minus any royalties or fees paid, and for machines without royalties or fees the metrics are equivalent. For example, if royalties are 5% of Coin-In, Coin-In for the day was $8,000, and Par Percentage is 9%, then Theoretical Take-Home Win for the day would be $8,000·(9%−5%)=$320.

Utilizing the framework described herein, the value of a change in the mix of machine types based on expected total theoretical net win as calculated utilizing estimated supply elasticities of occupancy can be determined utilizing a supply-driven machine mix optimization model. The model can operate under assumptions that theoretical net win is stable in time, and dependent only on the type of machine in question. As such, the data relative to factors such as location and seat type which do not directly relate to the type categories as the user chooses to define them can be normalized. Time variables utilized in the model can be assumed to be relative to current time; e.g. when units are days, t=6 corresponds to 4 days before the present.

Supply Elasticity of Occupancy can be estimated in accordance with the following methodologies. For a particular gaming environment, the machines can be partitioned in n types. For a given change from supply $S_1$ to $S_2$ of machines of a particular type (i.e., type j) at a particular point in time t units ago, and induced change in mean occupancy rates from $O_1$ to $O_2$, the supply elasticity of occupancy observed at time t to be the quantity can be defined as:

$$E_{j,t} = \frac{\frac{S_1+S_2}{2}}{\frac{O_1+O_2}{2}} \times \frac{O_2-O_1}{S_2-S_1} \quad \text{EQ. 4}$$

This is best understood as the mean of percentage change in occupancy divided by percent change in supply, where the mean is taken over both directional movements (i.e, on the supply side, both $S_1 \to S_2$ and $O_1 \to O_2$, and vice versa $S_2 \to S_1$ and $O_2 \to O_1$).

In accordance with the present disclosure, a methodology for estimating the supply elasticity of occupancy for a particular machine type based on historical data can be established. To do so, considerations to the time windows can be restricted to be around when machines of a particular type were added or removed from the casino floor; let $S_{1,i}$ be the number of machines of type j available for play before the change at time $t_i$, and $S_{2,i}$ the number of machines available after the change.

An exponential weighting methodology can be used to derive an estimate of the current elasticity for machines of type j, relative to the supply $S_0$ of machine type j available today:

$$\hat{E}_j = \frac{\alpha + \sum_i E_{j,t_i} e^{-\beta t_i - \gamma\left(\left|\frac{\frac{S_{1,i}+S_{2,i}}{2} - S_0}{S_0}\right|\right)}}{\delta + \sum_i e^{-\beta t_i - \gamma\left(\left|\frac{\frac{S_{1,i}+S_{2,i}}{2} - S_0}{S_0}\right|\right)}} \quad \text{EQ. 5}$$

where the hyperparameters α, β, γ, and δ can be optimized with any number of machine learning and/or grid-search type techniques.

In some cases, α and δ (or their ratio $$\frac{\alpha}{\delta}$$

can be set equal across all types, or impose restrictions on the variability of their proportion from an average or median, since the ratio $$\frac{\alpha}{\delta}$$

is incorporated as a smoothing factor to supplement scenarios in which amount of available observations for a specific type is low, the data exhibit high variance, or other such cases when the historical elasticities do not provide highly reliable estimates.

In accordance with the present disclosure, cross supply elasticities of occupancy can be estimated. Supply elasticity of occupancy is useful in estimating the marginal impact of adding or removing machines of a specific type, if the universe consisted exclusively of machines of that type. However it fails to account for the high degree of substitutability between machine types for most players. As such, cross-supply elasticities of demand can be utilized to capture these effects.

The cross supply elasticity of occupancy of machine type j relative to k at time t when the supply of machine type j is changed is defined similarly to the supply elasticity of occupancy observed at time t, describe above. With regard to determining ross supply elasticity of occupancy of machine type j relative to k at time t, the pre- and post-change supply quantities $S_{1,i,j}$ and $S_{2,i,j}$ are relative to machine type j, while the pre- and post-change mean occupancy rates $O_{1,i,k}$ and $O_{2,i,k}$ are relative to machine type k:

$$E_{j,k,t_i} = \frac{\frac{S_{1,i,j} + S_{2,i,j}}{2}}{\frac{O_{1,i,k} + O_{2,i,k}}{2}} \times \frac{O_{2,i,k} - O_{1,i,k}}{S_{2,i,j} - S_{1,i,j}} \quad \text{EQ. 6}$$

This equation can be used in conjunction with an exponential down-weighting methodology across both time and supply similarity to develop an estimate for current cross price elasticity of demand for each pair j, k of machine types. For each pair of machine types j, k considerations can be restricted exclusively to those points in time $t_i$ in which a change was made to the total supply of machine type j and estimate the true cross price elasticity of occupancy of machine type j relative to k at the current time to be the quantity:

$$\hat{E}_{j,k} = \frac{\alpha + \sum_i E_{j,k,t_i} e^{-\beta t_i - \gamma\left(\frac{\left|\frac{S_{1,i,j}+S_{2,i,j}}{2} S_{0,j}\right|}{S_{0,j}}\right)}}{\delta + \sum_i e^{-\beta t_i - \gamma\left(\frac{\left|\frac{S_{1,i,j}+S_{2,i,j}}{2} - S_{0,j}\right|}{S_{0,j}}\right)}} \quad \text{EQ. 7}$$

where $S_{0,j}$ represents the current supply of machine type j. It is noted that this equation can be sufficient for calculating both supply elasticities and cross-supply elasticities, as this EQ. 7 reduces to EQ. 5 when j=k, so EQ. 7 can be sufficient for calculating both supply elasticities and cross-supply elasticities.

In accordance with the present disclosure, the total (house) theoretical Net win can be estimated. First, the theoretical net win for all machines of type k when we increase the supply of machine type j from $S_{1,j}$ to $S_{2,j}$ is calculated. With a mean occupancy rate of machine type k of $O_{1,k}$, a mean number of handle pulls per minute of $H_k$, a mean wager size of $B_k$, and a number of machines $N_k$ of type k, the expected theoretical net win of machines of type k can be estimated as $$\hat{W}_k = H_k B_k N_k O_k\left(1 + \hat{E}_{j,k}\left(\frac{S_{2,j}}{S_{1,j}} - 1\right)\right) \quad \text{EQ. 8}$$

Assuming now a user intends to make simultaneous changes to supply quantities of multiple different types of machines. Let $S_{1,j}$ and $S_{2,j}$ be the quantities of machine type j before and after the change, and note that each change will have a marginal impact on the occupancy rate of machine type k of $$E_{j,k}\left(\frac{S_{2,j}}{S_{1,j}}\right).$$

Adding up these marginal changes to the base occupancy rate, the theoretical net win $W_k$ is estimated as:

$$\hat{W}_k = H_k B_k N_k O_k\left(1 + \sum_j \hat{E}_{j,k}\left(\frac{S_{2,j}}{S_{1,j}} - 1\right)\right) \quad \text{EQ. 9}$$

For a given collection of changes in supply of machine types i from quantities $S_{1,i}$ to $S_{2,i}$, the estimate of the expected total (house) theoretical net win W is:

$$\hat{W}_k = \sum_k H_k B_k N_k O_k\left(1 + \sum_j \hat{E}_{j,k}\left(\frac{S_{2,j}}{S_{1,j}} - 1\right)\right) \quad \text{EQ. 10}$$

In view of the model of total win based on a number of quantified changes in machine types, it is possible to maximize this equation to determine the theoretically optimal mix of machines. However, this is a very delicate process because of the nature of elasticities and their tendency to change as one moves along the supply/occupancy curve. In the event the model recommends a mix of machines which is highly different from the existing mix, a slow but consistent implementation process and frequent re-calculation of elasticities would be a strong validation step to ensure the proper changes are being recommended. As such, the systems and methods described herein can provide through the interface answers to operational questions such as “Which machine type should I incrementally increase or decrease?”, or “Which machine type should I replace with which machine type?” Beneficially, these kinds of incrementally-minded questions can be well-addressed by the platform described herein, and longer-term or wholesale changes can be systematically achieved and validated through such repeated incremental changes.

In some embodiments, an alternate formula for elasticities is utilized. Namely, EQ. 4 and 7 can be used to calculate elasticities incorporate a scaling factor:

$$\frac{\left|\frac{S_{1,i} + S_{2,i}}{2} - S_0\right|}{S_0} \quad \text{EQ. 11}$$

This scaling factor can exponentially down-weight historical elasticities which were observed under supply quantities which were significantly different from the supply $S_0$ available today. This is because elasticities are not constant along most supply/occupancy curves, and the modeling seeks to allow changes which occurred under similar supply conditions to most greatly influence the estimates.

While this factor scales the absolute difference to a proportion of the existing amount, depending on performance the absolute (unscaled) difference may be used in its place:

$$\left|\frac{S_{1,i}+S_{2,i}}{2}-S_0\right| \quad \text{EQ. 12}$$

As with many aspects of the model, this choice can be dependent on the user and can potentially vary depending on a number of factors, including the casino and the choice of class types.

In accordance with the present disclosure, the platform described herein can recommend replacement machines for specific floor locations. More specifically, the platform can take a specific floor layout and a specified machine within that layout and recommend an optimal machine to replace the specified machine. Such determination can be based on expected theoretical win, with the platform producing an estimate of that expected theoretical win.

First, the expected value model is learned in accordance with one non-limiting embodiment by normalizing the data for yearly, monthly, and weekly seasonal trends. Next, normalized data is regressed onto seat type dummy variable and normalized for effect. The floor distribution is then constructed and residuals are normalized for effect. For each type of non-substitutable play, the appetite is estimated and value from machines of that type is subtracted off proportional to respective location values under the floor distribution. Next, the game novelty curve is constructed and residuals are normalized for effect. The overall game novelty curve is then identified and for each game type, a sensitivity to game novelty effect is calculated. Covariance with nearby games for each pair of game types is calculated and normalized for effect. A regression on the residuals is performed to determine popularity of game type and normalized for effect. For the specified location, an expected value for each possible game type according to the model is calculated. Finally, the platform recommends a game type with the highest expected value.

In accordance with some embodiments, time-series techniques can be utilized to de-seasonalize the data across yearly, monthly, and weekly timescales. This approach can normalize the data so that theoretical wins can be compared across different times. Once seasonality has been normalized for, a linear regression can be ran on the dummified Seat Type variable on the resulting normalized data thereby allowing a comparison of machine performance across different seat types.

At this point the model is as follows, with t subscript indicating a time series quantity applied pointwise in time:

$$Y=\text{Seasonality Adjustment}_t\times\text{Seat Type}+\text{Residual} \quad \text{EQ. 13}$$

Having controlled for both seasonality and seat type effects, a floor distribution can be created that represents the value of placing a machine at a particular location, regardless of when and of what seat type. Any of a multiple methodologies can be utilized, depending on whether or not pairwise distances between machines are available or if the model is relying merely on bank/zone/area data.

First, a radial basis function K(x,y) is selected, which is any real-valued function satisfying K(a,b)=K(c,d) whenever |a−b|=|c−d|], such as the Gaussian radial basis function. For a specific location $x_0$ and time window t, let $g(x_0,t)$ be the game title at location $x_0$ during time window t and fix another game title G. Let $A_t(h)$ be the function which yields the average theoretical win of game title h during time window t across all machines playing game title h during time t, and T be the sum total number of time units for which we have data on games positioned at location $x_0$. If $w(x_0,t)$ is the theoretical win of the machine at location $x_0$ during time window t, then the floor distribution $F(x_0)$ of the value of floor location $x_0$ is $$F(x_0)=\frac{1}{T}\left(\sum_{Locations\ x_i}\left(K(|x_i-x_0|)\sum_t\left(\omega(x_0,t)\frac{A_t(g(x_i,t))}{A_t(g(x_0,t))}\right)\right)\right) \quad \text{EQ. 14}$$

As a result, the model is now:

$$Y=\text{Seasonality Adjustment}_t\times(\text{Seat Type}+\text{Floor Value}+\text{Residual}) \quad \text{EQ. 15}$$

In accordance with the present disclosure, the next step utilizes estimates of the non-substitutable play for each game type. In particular, non-substitutable play is defined to be the amount of coin-in which will be wagered regardless of arrangement or availability on a well-defined subset of machines. Such estimates can be provided, for instance, by marketing and/or operations teams. One example of non-substitutable play would be those players which exclusively play penny slots. Further, in accordance with some embodiments, non-substitutable play is assumed to be relatively fixed for each game type, and if any additional money were to be wagered by players it would be substitutable. This approach implies non-substitutable play is not impacted by the introduction of a new or different type of machine, and should therefore be removed from consideration. It is noted that it is removed this late in the process in order to remove it proportional to the rate at which machines of any particular type are played, so as to account for differences in rates of play based on floor location (i.e, not debit low-traffic/low-win machines equally with high-traffic/high-win machines).

Assuming the total non-substitutable play by type has been quantified, it can be multiplied by an average/weighted average of par percentage for machines providing that play type, and the resulting amount divided among each machine providing that play type proportional to its locational value when evaluated under the floor distribution.

As an example, suppose an organization estimates they have $5M in non-substitutable penny-slot play per month on average, and 100 machines which allow penny-slot play. The next step would be to evaluate the floor distribution at each of those 100 locations, say with results {1.4, 0.8, 0.7, 1.1, . . . }, totaling to 89.2. Say the mean par percentage is estimated at 9%, then the final step would be to subtract the $5M×0.09=$450k among each of the 100 machines proportionally; that is, subtract $450k×1.4/89.2 $7k from machine 1, subtract $450k×0.8/89.2≈$4k, and so on.

If non-substitutable play has experienced significant swings or changes over time, the formulation of the non-substitutable play can be considered a time series with yearly estimates, and subtracted as a time series from the corresponding years of historical data.

As such, the model is now:

$$Y\text{=Seasonality Adjustment}_t\times(\text{Seat Type+Floor Value+Non-substitutable Play+Residual}) \quad \text{EQ. 16}$$

In accordance with some embodiments of the present disclosure, it is assumed that game novelty begins adding value initially rather rapidly, then over time begins to fall to zero. This behavior is modeled well with a third-order polynomial. Further, it can be assumed the value-add of novelty is unique to a game title. For each game title the residuals for machines playing that game title are centered on "day 1", which is the first day each was available for play on the floor. For each successive day for the following 6 months the mean of the residuals is computed for games of that type. The mean of all residuals over the entire 6 months is then subtracted off from this time series, to center the series on 0.

A third order polynomial $p_3(t)=\beta_0 t+\beta_1 t^2+\beta_2 t^3$ can then be to the centered time series, which can be accomplished via a number of existing mathematical computing libraries. The title-specific novelty factor can be added to the model, to obtain the following model:

$$Y\text{=Seasonality Adjustment}_t\times(\text{Seat Type+Floor Value+Non-substitutable Play+Novelty}_t\text{+Residual}) \quad \text{EQ. 17}$$

In accordance with the present disclosure, complimentary effects with nearby games can be accounted for in the model. As the methods described herein are data-driven, there may be circumstances in which a sufficient quantity and variety of data to perform robust analysis is not present. In such situations, the complimentary Effects term may be omitted from the subsequent model equations.

To perform analysis in accordance with the present disclosure, the analysis can be restricted to those moments in time during which an old machine was swapped out for a new one. In particular, for a specific game title under examination, the model can be restricted to analyze the scenarios in which either a machine in the bank, or the newly swapped in machine is playing the game title in question.' For each game title, the analysis can be further restricted to the situations in which one of the bank machines and the newly swapped in machine is playing the game title in question, and the other game title under consideration (which could potentially be the same). The average ratio increase in theoretical net win can be computed across both machines for the two months following the swap as compared to the two months preceding the swap. This ratio is compared to the same ratio when computed for all newly-swapped-in machines relative to all other machines in the same bank. While this embodiment utilizes a 2 month window, it is to be appreciated that other suitable periods of time can be used.

This ratio is then multiplied by the preceding model to obtain a model equation which accounts for complimentary effects of nearby games:

$$Y\text{=Seasonality Adjustment}_t\times((\text{Seat Type+Floor Value+Non-substitutable Play+Novelty}_t)\times\text{Complimentary Effects+Residual}) \quad \text{EQ. 18}$$

Finally, the residuals of the preceding model can be regressed against dummy variables corresponding to game type attributes to determine the popularity of various games. These attributes may include, for example, game title, manufacturer, and so forth. This results in a final model:

$$Y\text{=Seasonality Adjustment}_t\times((\text{Seat Type+Floor Value+Non-substitutable Play+Novelty}_t)\times\text{Complimentary Effects+Popularity+Error}) \quad \text{EQ. 19}$$

After training the above model, the model can be evaluated for the specific location in question for each potential game title. This evaluation will yield an expected value for each potential game title. The platform can then identify the machine that should be introduced to the location. More specifically, it can recommend the game title with the highest of these expected values.

In accordance with the present disclosure, change point detection can be used to identify machines which have changed earning behavior. More specifically, utilizing the frameworks and conventions described herein, change point detection can be utilized to identify machines which have experienced downturns in performance as determined by theoretical net win. Change points within time series are considered to be points in which the process generating the time series has undergone a meaningful structural change, and are particularly interested in identifying those change points which result in a change in the underlying linear trend governing the time series.

The identified change points can be utilized to model machine performance in a piecewise linear fashion, which in turn allows users to make decisions about which machines' earning behaviors have changed sufficiently to warrant replacement. In accordance with some embodiments, machines are considered which have been on the floor in the same stand continuously for at least $n\geq 30$ machine days. The possibility of change points can be examined, for example, in the last $$\min\left(90, \frac{2n}{3}\right)$$

machine days, but at least $$\max\left(15, \frac{n}{3}\right)$$

machine days ago.

Example methodologies for change point detection can be found in Achim Zeileis et. al. *strucchange: An R Package for Testing for Structural Change in Linear Regression Models*, Available: https://cran.r-project.org/web/packages/strucchange/vignettes/strucchange-intro.pdf; D. W. K. Andrews. *Tests for parameter instability and structural change with unknown change point.* Econometrica, 61:821-856, 1993; D. W. K. Andrews and W. Ploberger. *Optimal tests when a nuisance parameter is present only under the alternative.* Econometrica, 62:1383-1414, 1994. R. L. Brown, J. Durbin, and J. M. Evans. *Techniques for testing the constancy of regression relationships over time.* Journal of the Royal Statistical Society B, 37:149-163, 1975; G. C. Chow. Tests of equality between sets of coefficients in two linear regressions. Econometrica, 28:591-605, 1960, each of which are incorporated herein by reference in their entirety.

In accordance with the present disclosure, a significance threshold a is set to an appropriate value, such as $\alpha=0.025=2.5\%$. For each machine which has been on the floor for over a month, the Fstats function within the strucchange package can be utilized to compute a new time series $p_t$ of p-values from the time series of the machine's theoretical net win testing the null hypothesis that no structural change has occurred to the alternate hypothesis that a structural change occurred at time t, for each possible change point t within the $$\min\left(90, \frac{2n}{3}\right)$$

machine days but at least $$\max\left(15, \frac{n}{3}\right)$$

machine days ago.

Once we the series of p-values $p_t$ is determined, $p_t$ is transformed into a 3-day moving average $\overline{p}_t$ to smooth the time series and identify the points $c_i$ for which $\overline{p}_{t_i}<\alpha$. If $i>1$, only the points $C=\{C_i\}$ identified by the following algorithm are kept in an effort to ensure multiple change points are not retained which in fact all represent the same underlying change:

1. $\tau=0$
2. Set $C_\tau=\min_{c_i}\overline{p}_{c_i}$, the time $c_i$ corresponding to the minimum achieved by $\overline{p}_t$
3. Until no $C_{\tau+1}$ can be found satisfying the following,
    1. Set $C_{\tau+1}$ equal to the time $c_j$ corresponding to the minimum value achieved by $\overline{p}_t$ over the remaining $c_i$ not already in C, which also satisfy the condition that $\overline{p}_{t_k},\overline{p}_{t_l}>\alpha$ for some $k\in(t_\phi,t_{c_j})$ and $l\in(t_{c_j},t_\theta)$ where $\phi$ is the maximum in C less than $c_j$ and $\theta$ is the minimum in C greater than $c_j$. This ensures that the significance peak (significance being calculated as 1−p value) achieved at $C_{\tau+1}$ is "prominent" above the threshold significance; in particular, it ensures the significance of $\overline{p}_t$ falls below the significance level on either side of $C_{\tau+1}$ before it rises above the threshold again at $C_{t_\phi}$ and $C_{t_\theta}$ below and above $c_j$, respectively.
    2. Increment $\tau$ (i.e, set $\tau=\tau+1$)

The retained points $C=\{C_i\}$ are the identified change points.

Next, using the identified change points, machine performance can be modeled. More specifically, historical machine performance can be modeled by piecewise linear regression, with break points at the identified change points. This constitutes simple linear regression on the time windows between each change point, and can be accomplished with a number of scientific computing packages.

A choice can be made whether to assume the underlying function is piecewise continuous, which would place significant restrictions on the regression results but would model the scenario in which effects which induce change points do not manifest as immediate jumps in theoretical net win, but rather gradual accelerations following a linear trend.

In accordance with the systems and method described herein, machines for which performance as measured by theoretical net win is statistically significantly deviating from the specified parameters of their supported game combos can be identified. Such machines can be inspected for any source of mis-performance, such as physical malfunction, fraud, and so forth.

In accordance with the present disclosure, a distribution of a game combination can be developed. First, starting with a single game combination on a single machine, the limiting distribution governing actual win for a specific time window can be determined, given the number of handle pulls, par percentage and long-run standard deviation of the game combination. Next, the same is determined for a multi-denomination/multi-game machine, and an associated p-value is calculated to determine the extremity of the results. A correction can then be introduced to accommodate comparisons of multiple machines for the purposes of outlier detection.

By way of example, suppose that, within a fixed time window T, this is a number of handle pulls h, theoretical win per handle pull $\pi$ (equal to par percentage times wager), and long-run standard deviation s. Since consecutive handle pulls are i.i.d, from the Central Limit Theorem, the mean win per handle pull over h handle pulls is known to follow a normal distribution with mean $\pi$ and standard deviation $$\frac{s}{\sqrt{h}}.$$

That is, for large h, the approximate distribution is:

$$\frac{\omega}{h} \sim N\left(\pi, \frac{s^2}{h}\right) \quad \text{EQ. 20}$$

where $\omega$ is the distribution of actual win over the time period T. Through basic properties of i.i.d. normal random variables, it can be seen that:

$$\frac{\omega}{h} \sim N(h\pi, s^2) \quad \text{EQ. 21}$$

Based on the above, the distribution of a machine can be developed. Extrapolating the above across multiple game combinations, a specific game combination may have wins $w_i$, theoretical wins per handle pull $\pi_i$, long-run standard deviations $s_i$, and handle pull counts $h_i$. Then actual win w is given by $w=\Sigma_i w_i$, and, after applying more basic properties of normal distributions, that the limiting distribution is given by:

$$\omega = \sum_i \omega_i \sim \sum_i N(h_i\pi_i, s_i^2) = N\left(\sum_i h_i\pi_i, \sum_i s_i^2\right) \quad \text{EQ. 22}$$

Now that the limiting distribution of actual win w is known, with the guiding assumption each $h_i$ is either comparatively large (>25-30) or zero a p-value can be computed for the observed actual win W. To do this, W is normalized by the parameters of the limiting distribution w to obtain a z-statistic, and the area under the standard normal distribution beyond this point is computed. In particular the z-statistic is given by:

$$z = \frac{W - \sum_i h_i\pi_i}{\sqrt{\sum_i s_i^2}} \quad \text{EQ. 23}$$

The associated p value can be computed with a suitable statistical package or reference table.

Next, in accordance with the present disclosure, individual machines from among a population (say, of size n) which are not performing according to their statistical specifications can be identified. To combat the problems inherent when making multiple comparisons, two example options, both of which require selecting a confidence level a before performing any calculations, are described here. The first option is to employ the Bonferroni correction, and test p values at the significance level of $$\frac{\alpha}{n};$$

any machines which have p-values falling below this threshold should be inspected for irregularities. The second option is to use a modification of the Bonferroni correction which attempts to accommodate the potential for different rates of play among different machines. By way of example, suppose machine j has had $H_j$ number of handle pulls. The p-values can then be computed and any machines with p-values falling below $$\frac{H_j \alpha}{\sum_j H_j}$$

can be inspected.

Referring to FIG. 1, an embodiment of gaming analytics computing system 100 is depicted. The gaming analytics computing system 100 can be used by a user 142, such as a casino operations executive or other type of user. Using the data analytics and modeling techniques described above, the gaming analytics computing system 100 can be used to provide the user 142 with specific, quantified operational recommendations, as described in more detail below.

The gaming analytics computing system 100 can receive data 124 generated from one or more gaming machines 122 associated with a gaming environment 120. The data 124 from the gaming machines 122 can be supplied to the gaming analytics computing system 100 through one or more intermediaries, such as host system 128. The host system 128 can include, for example, a slot management system, a casino management system, and/or other data aggregator systems. In some implementations, the data 124 can be supplied directly to the gaming analytics computing system 100 some or all of the gaming machines 122. The gaming machines 122 can each be, without limitation, any type of gaming machine, such as a video slot machine, a poker machine, a reel slot machines, a multi-game unit, among other types of electronic gaming machines know in the art. While only three gaming machines 122 are shown in FIG. 1 for illustration purposes, it is to be appreciated that the gaming analytics computing system 100 can be configured to receive data from hundreds or even thousands of different gaming machines associated with a gaming environment 120, as represented by gaming machine 126. Furthermore, it is to be appreciated that the gaming environment 120 can be any suitable environment, such as a casino gaming floor, or multiple gaming floors across a plurality of different properties. The data 124 utilized by the gaming analytics computing system 100 can include, without limitation, streaming data (i.e., gameplay related data), non-changing data (i.e., manufacturer), and/or updatable data (i.e., location, seat type). By way of example, the data 124 can include any of the following information: unique machine ID, game combination, duration of measurement window, time stamp, coin-in, coin-out, drop, jackpots paid out, hopper fills, and location/placement information.

The gaming analytics computing system 100 can be in communication with the host system 128 via an electronic communications network. The communications network can include a number of computer and/or data networks, including the Internet, LANs, WANs, GPRS networks, etc., and can comprise wired and/or wireless communication links. In addition to the host system 128, the gaming analytics computing system 100 can be in networked communication with other devices, such as other computing devices associated with the gaming environment 120 or other third party sources of data. Additionally, other sources of data can be supplied to the gaming analytics computing system 100 through appropriate data transmission or transfer techniques, such as flat files and so forth. By way of example, in some embodiments, the gaming analytics computing system 100 can receive player loyalty data, player spend data, or other player-specific demographics.

The gaming analytics computing system 100 can be provided using any suitable processor-based device or system, such as a personal computer, laptop, server, mainframe, or a collection (e.g., network) of multiple computers, for example. The gaming analytics computing system 100 can include one or more processors 102 and one or more computer memory units 104. For convenience, only one processor 102 and only one memory unit 104 are shown in FIG. 1. The processor 102 can execute software instructions stored on the memory unit 104. The processor 102 can be implemented as an integrated circuit (IC) having one or multiple cores. The memory unit 104 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 104 can store executable software and data for the analytics platform described herein. When the processor 102 of the gaming analytics computing system 100 executes the software, the processor 102 can be caused to perform the various operations of the gaming analytics computing system 100, such as optimizing machine performance, optimize floor performance, and provide a query-driven user interface 142.

Data used by gaming analytics computing system 100 can be from various sources, such as a database(s) 106, which can be electronic computer databases, for example. In some embodiments, the database 106 comprises a graph database utilizing graph structures for semantic queries with nodes, edges and properties to represent and store data. Additional details regarding example operational use of a graph database are provided below with reference to FIGS. 4A-4B. The data stored in the database(s) 106 can be stored in a non-volatile computer memory, such as a hard disk drive, a read only memory (e.g., a ROM IC), or other types of non-volatile memory. In some embodiments, one or more databases 106 can be stored on a remote electronic computer system, for example. As it to be appreciated, a variety of other databases, or other types of memory storage structures, can be utilized or otherwise associated with the gaming analytics computing system 100.

The gaming analytics computing system 100 can include one or more computer servers, which can include one or more web servers, one or more application servers, and/or one or more other types of servers. For convenience, only one web server 110 and one application server 108 are depicted in FIG. 1, although one having ordinary skill in the art would appreciate that the disclosure is not so limited. The servers 108, 110 can allow content to be sent or received in any of a number of formats, which can include, but are not limited to, text-based messages, multimedia messages, email messages, smart phone notifications, web pages, and other message formats. The servers 108, 110 can be comprised of processors (e.g. CPUs), memory units (e.g. RAM, ROM), non-volatile storage systems (e.g. hard disk drive systems), and other elements.

In some embodiments, the web server 110 can provide a graphical web user interface, such as the interface 140A, through which various users 142 can interact with the gaming analytics computing system 100. The graphical web user interface can also be referred to as a client portal, client interface, graphical client interface, and so forth. The web server 110 can accept requests, such as HTTP/HTTPS requests, from various entities, such as HTTP/HTTPS responses, along with optional data content, such as web pages (e.g. HTML documents) and linked objects (such as images, video, and so forth). The application server 108 can provide a user interface, such as the interface 140A, for users who do not communicate with the gaming analytics computing system 100 using a web browser. Such users can have special software installed on their computing devices to allow the user to communicate with the application server 108 via a communication network.

A user 142 can be presented with the interface 140A, as generated by the gaming analytics computing system 100. A user 142 can utilize, for example, a mobile phone, a smartphone, a tablet, a laptop, a desktop, a kiosk, or other computing device capable of displaying the interface 140A. In accordance with modeling described above, the interface 140A can identify one or more recommendations 144 based on the data analytics described above. The recommendation 144 can be supported by a data visualization 146. The particular format of the data visualization 146 can be chosen by the gaming analytics computing system 100 based on, for example, the underlying data and the type of query submitted by the user 142.

Furthermore, in some embodiments, quantifications 148 can also be presented to the user 142, with the quantifications 148 providing justifications for the associated recommendation. In some embodiments, the gaming analytics computing system 100 can utilize domain knowledge of the economics of the gaming industry to set default values for calculating the fully loaded cost/value of the recommendations 144, among other types of quantified metrics. Additionally, in some implementations, a user 142 can provide specific values their organization thereby allowing various parameters to override default values. As a result, the gaming analytics computing system 100 can provide, via the interface 140A, a fully contextualized quantification 148 of the recommendation 144. As schematically depicted in FIG. 1, interface 140B shows that the data visualization 146 can change when a different recommendation and different quantifications are presented to the user 142 (shown as recommendation 2 and quantifications B on interface 140B).

Figure 2:
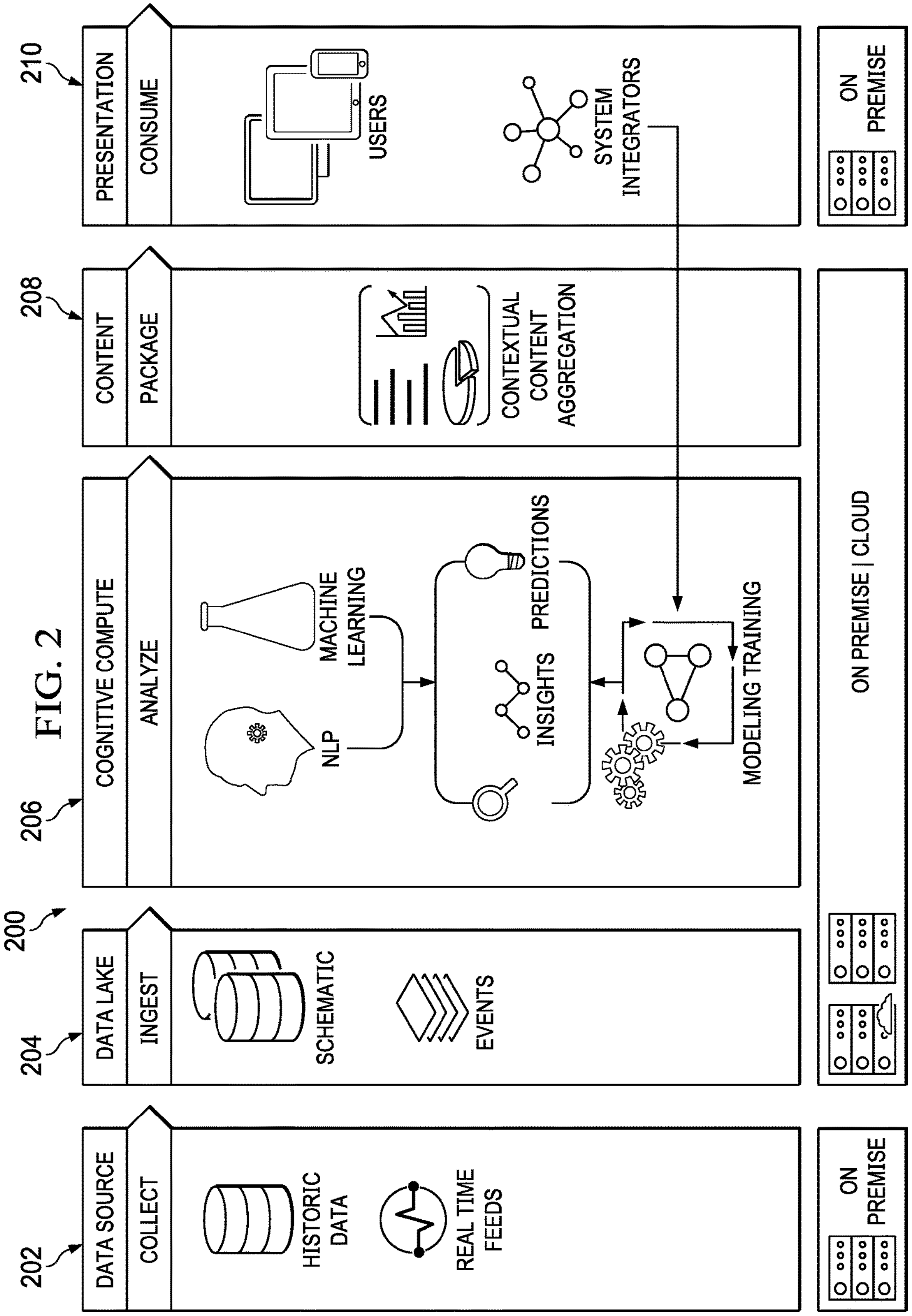
FIG. 2 schematically depicts the architecture of a gaming analytics computing system in accordance with the present disclosure.

FIG. 2 schematically depicts the architecture 200 of a gaming analytics computing system in accordance with one non-limiting embodiment. The architecture can include data sources 202 which provide relevant data such as, for example, historic data and real time feeds. The data from the data sources 202 can be ingested into a data warehouse, schematically shown as a data lake 204. The data can then be analyzed 206 in accordance with the system and methods described herein. Using a combination of natural language processing and machine learning, along with trained models, predictions based on the data can be determined and insights developed. The content 208 can then be contextually aggregated for presentation 210 to users. In accordance with various embodiments the architecture 200 can present the content 208 based on the preferences of the user 142 (FIG. 1). For instance, certain users can view the visualization (such as visualization 146 in FIG. 1) as a bar chart, while other users can view the same data in a different visualization based on their preferences. In addition, the visualization type can be determined by the type of information that is presented and the context of the question asked by the user. These preferences can be stored by the system per user.

Figure 3:
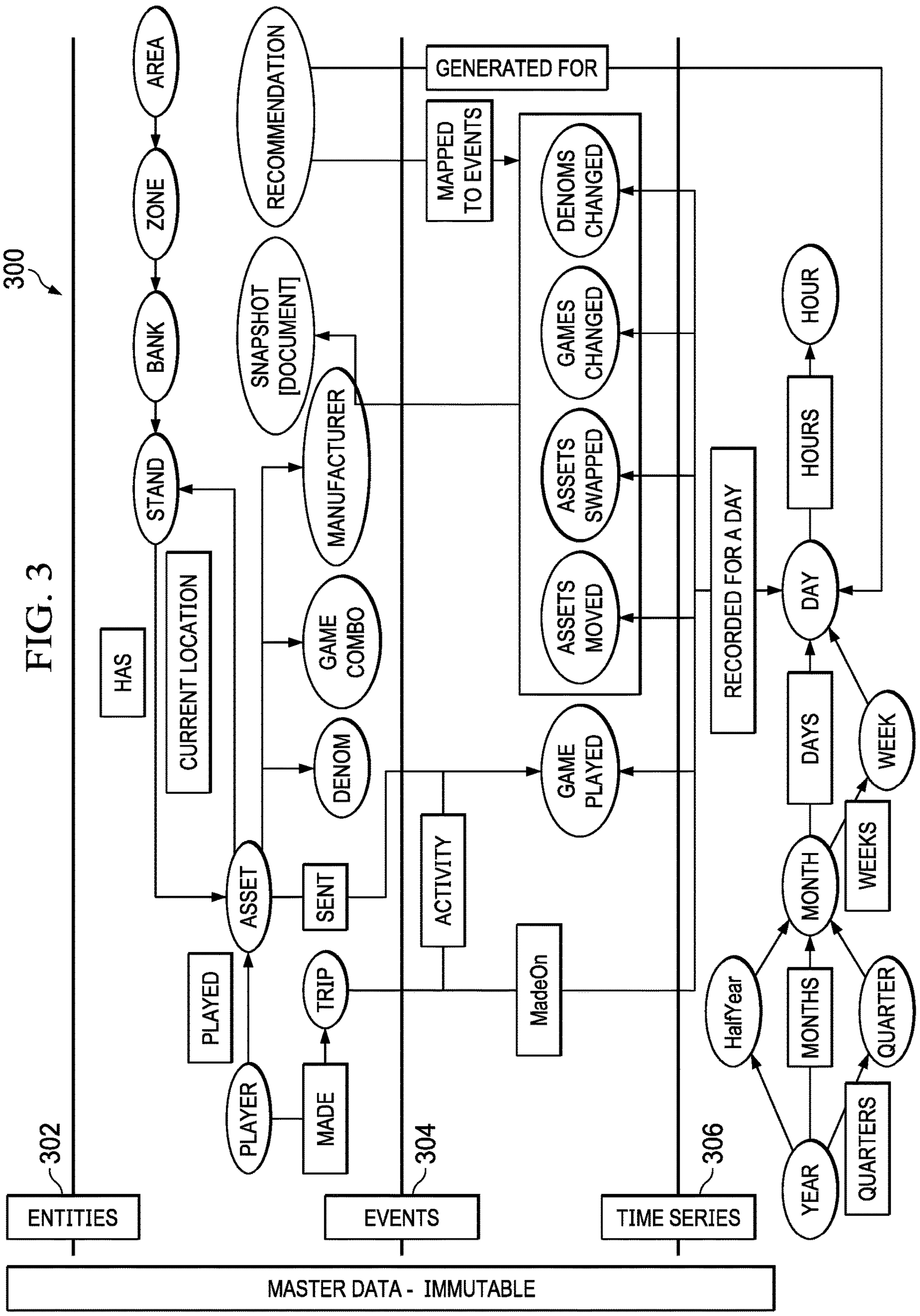
FIG. 3 schematically represents a data model in accordance with the present disclosure.

FIG. 3 schematically represents a data model 300 in accordance with the present disclosure. As shown, the data model 300 includes entities 302, such as players, gaming machines (shown as assets), which have various attributes associated therewith. The data model 300 also includes events 304 associated with the entities, such as data pertaining to when a player was at a particular gaming environment and what games they played. Other events are can be tracked as well, such as the movement of gaming machines and denomination changes, for example. Finally, various data stored within the data model 300 can be tied to appropriate time series 306 in order to provide the data modeling described herein.

Figure 4A:
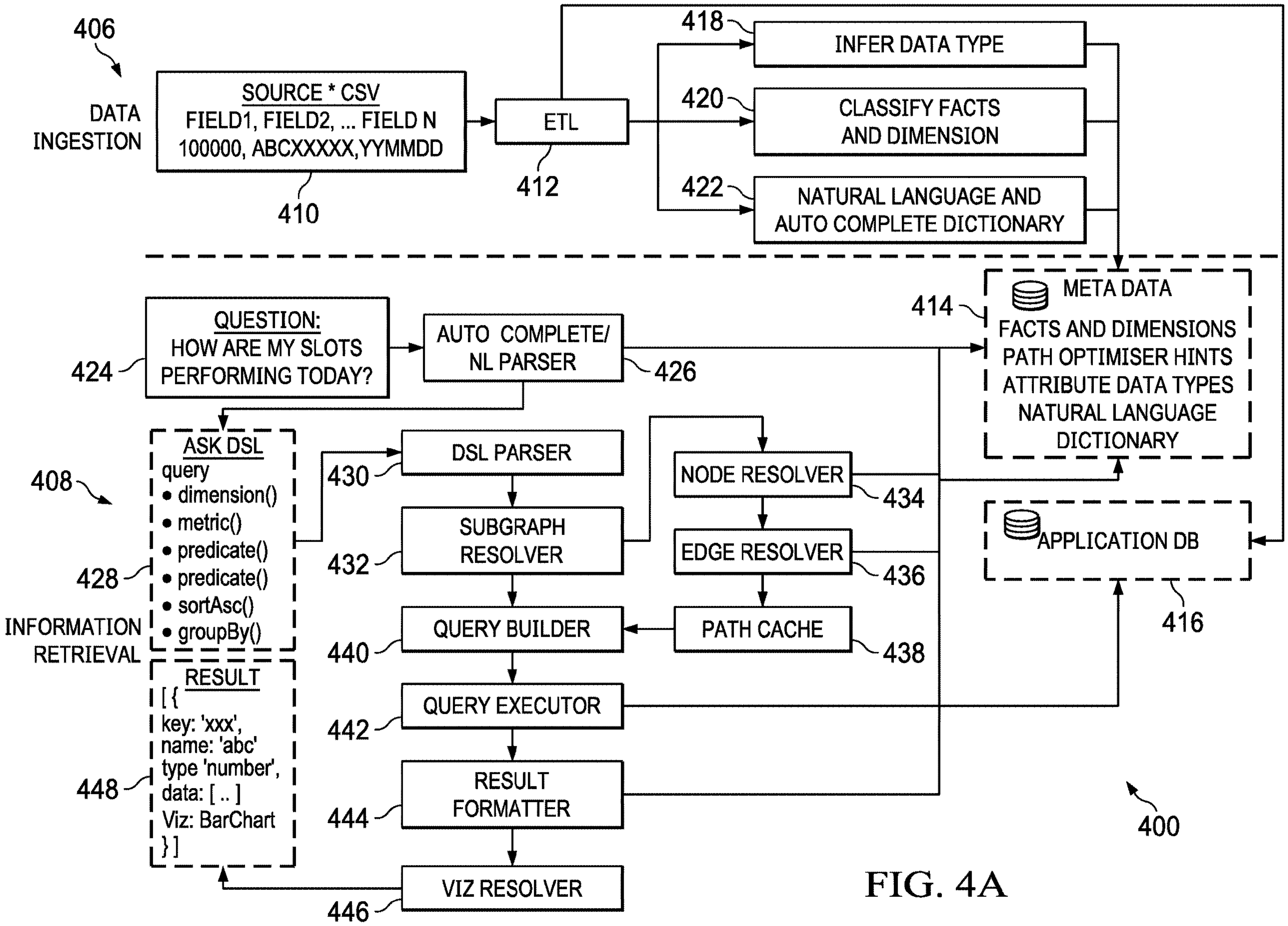

A gaming analytics computing system in accordance with the present disclosure can utilize a graph database as its core database for both storage and retrieval of analytical data. The gaming analytics computing system can provides a search driven interface for the user to query information. Generally, graph databases store data as nodes and edges. In accordance with the present disclosure, nodes can represent real world entities like gaming machines, players, game play, and so forth, while nodes contain attributes. Edges of the graph database represent the relationship between nodes (e.g., 'Asset IGT00001 was manufactured by IGT'). Example workflows 400, 450 of the complete process of storage and retrieval of analytical data are schematically depicted in FIGS. 4A-4B.

The workflow 400 is divided in to data ingestion 406 and information retrieval 408. Referring first to data ingestion 406, a gaming analytics computing system can ingest data from disparate systems. The data ingested can be gaming data and non-gaming data and can be supplied from gaming or non-gaming systems. In some cases, CSV (Comma Separated Value) files 410 are provided by the source systems. An extract, transform, load (ETL) process 412 can include two steps. It can build a metadata database 414 and then ingests data into the Application Database 416. The metadata database 414 consists of information about the data stored in the Application Database 416. The ETL process 412 can parse the source files to determine the data types 418 of the fields and also classify the data elements into facts and dimensions 420. Dimensions are entities (e.g., Player, Slots) and Facts are metrics about dimensions (e.g., Coin In, NetWin, Trips etc.). The facts and dimensions are further used to build a natural language/auto complete dictionary 422. The metadata 414 can be used by the ETL process 412 to build a connected graph of nodes and edges for the source data. The ingested data is stored in the application database 416.

Referring now to information retrieval 408, a user can interact with the system by asking questions 424. As shown at processing block 452 in FIG. 4B, an example question is "All slots with NetWin greater than $10,000 this month by manufacturer." To help the user build relevant questions, the system can have an auto complete feature 426. Depending on the first letter typed, the system can show the next set of relevant words, depending on the first word typed, the system can show the next set of relevant words that the user can select from, and depending on the set of words, the system can show the next set of relevant sentences that the user can select from. Internally the system uses the natural language/auto complete dictionary 422 to determine the next set of relevant words. Additionally, in accordance with some embodiments, the system can provide predicted questions based on the user's historical interactions or the user's role. By way of an example, a user's role (i.e., based on log-in credentials) can determine the suggested questions presented to the user via an interface. Additionally, as the user requests for certain types of information, the system can anticipate and recommend additional questions that will assist the user in retrieving additional useful information.

Once the question is fully formed, it is submitted to the system for information retrieval. The NL Parser 426 can parse the question and converts that into a standardized internal object structure "ask DSL" (Domain Specific Language) 428, as shown by processing block 454 in FIG. 4B. The DSL Object is a simplified way of representing any query in a technology agnostic format. It can consists of a dimension, a collection of metrics of interest about the dimension, a list of predicates to filter the result, and optional qualifiers like group by and sort by fields. Queries that are sent to the system are first converted to the ask DSL format before further processing.

The ask DSL object 428 can then be sent to the DSL parser 430 for further processing. The DSL parser parses the query to perform sanity checks on the format, validity of facts, dimensions, predicates and so forth. A valid query is passed on to the subgraph resolver 432. The subgraph resolver 432 can use the metadata database 414 to convert the ask object 428 to a subgraph. Generally, the subgraph resolver 432 can perform the following steps. First, at 434 it maps dimensions, metrics, predicates to nodes in the application graph database 416 (processing block 456, FIG. 4B). Next, at 436, it determines relations (edges) that connects the nodes 416 (processing block 458, FIG. 4B). Finally, at 438, it connects dimension with all nodes to build the complete subgraph. For each metric that is part of the query, the system finds out the node that has the attribute(metric). Once a node is identified, it is added to the nodes list. The process continues until all the attributes (metrics predicates, group by, sort by) are resolved.

At this point, the process of connecting nodes with the edges can start. The subgraph resolver 432 can start with the dimension node and try to connect that with all the metric, predicate, group and sort nodes. Once a subgraph is built, it is passed on to the query builder 440 to build the graph database specific query. The query can then be converted to a specific query language and passed on to the query executor 442 to fetch data (processing block 460, FIG. 4B). The query is executed against the application database 416 (processing block 462, FIG. 4B). The output result can be formatted by the Result Formatter 444.

The system can also determine an appropriate visualization to present the result to the user. The visualization resolver 446 can use the number of the metrics and other usage data to determine a set of visualizations that can be used by the interface to present the information to the user (such as using data visualization 146 in FIG. 1). The result 448 is finally rendered on the screen of a user interface. It is noted that most part of the processing described above involves resolving information dynamically and rely heavily on the meta data. To optimize processing time, meta data, resolved subgraphs can be cached.

In accordance with various embodiments, the natural language processing aspect of the system can be used to receive and parse a variety of commands from a user. For instance, a user can specify visualization type in a natural language query. Non-limiting examples of such queries include, but are not limited to, "net win by day as line chart", "key metrics by model last month as grouped bar chart grouped by metric then model", "heat map of top 1000 players", and so forth. In accordance with some embodiments, the natural language processing aspect of the system can be used to apply arithmetic functions or transformations. Non-limiting examples of such queries can include, but are not limited to, "net win—carded net win by day", "average net win by day", "standard deviation of net win by day", and so forth. Additionally or alternatively, the natural language processing aspect of the system can allow a user to provide alias variables or arithmetic function/transformation outputs, such as, for example, "net win as nw by day" and "average net win as avg_nw by month." A user can also utilize the natural language processing aspect of the system to use parentheses to specify order of operations, such as "Average (net win per day last year)." In some embodiments, the natural language processing aspect of the system can be used to group results in accordance with the user's request, such as, "average (net win by day) grouped by month. Additionally the natural language processing aspect of the system can be used to allow a user to specify various data ranges for the results, such as "net win from 2019/01/01 to 2019/03/01 by day."

Figure 5:
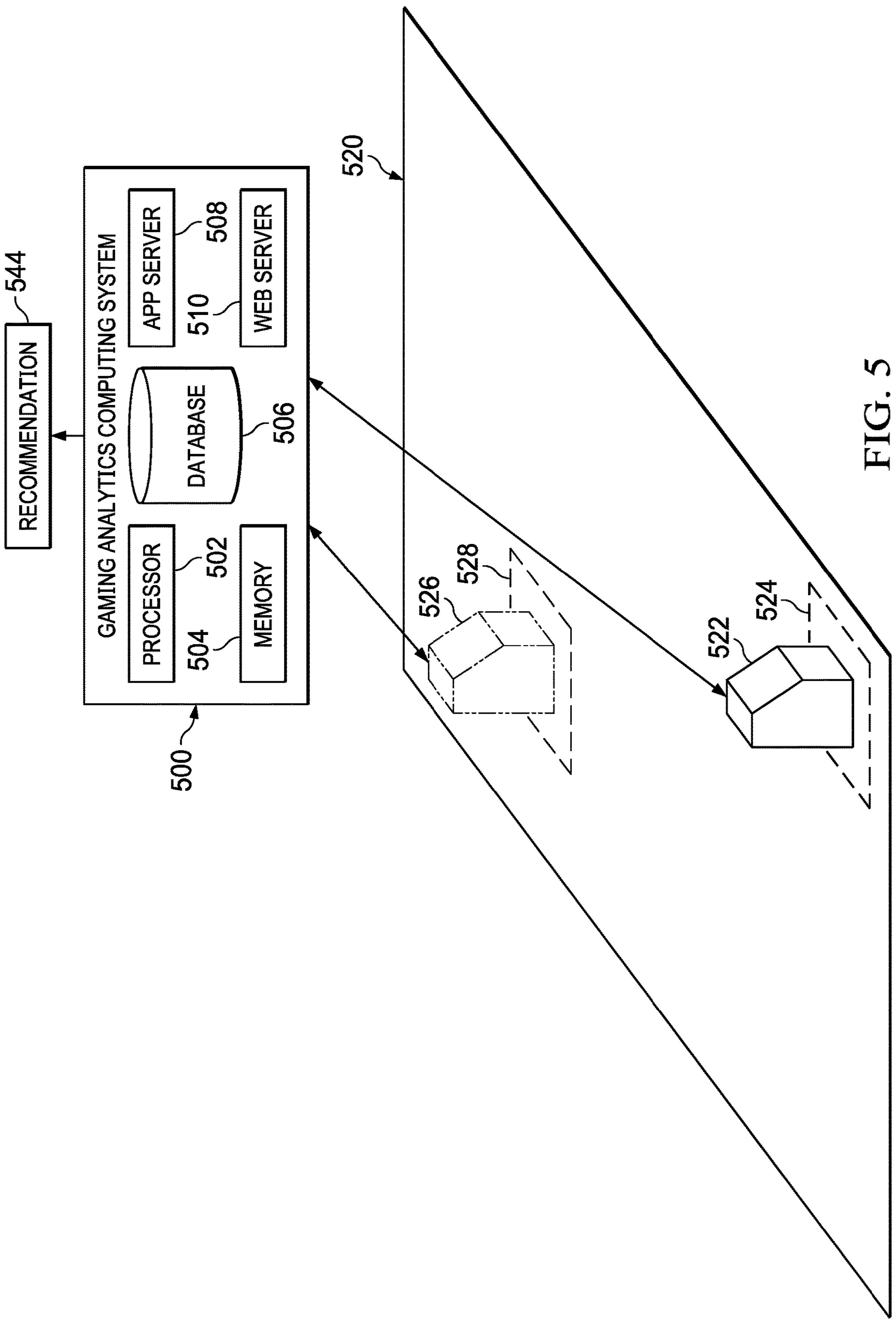
FIGS. 5-6 schematically depict example operational use cases in accordance with various non-limiting embodiments.

FIGS. 5-6 schematically depict example operational use cases in accordance with various non-limiting embodiments. Referring first to FIG. 5, a gaming analytics computing system 500 is shown, which can be similar to the gaming analytics computing system 100 of FIG. 1. As such, it can have one or more processors 502 and one or more computer memory units 504. The gaming analytics computing system 500 can also include a database 506, which can include the databases illustrated in FIG. 4A, for example. The gaming analytics computing system 500 can also have an application server 508 and/or a web server 510.

The gaming analytics computing system 500 can be associated with a gaming environment 520 within which gaming devices are operational. As shown, an existing gaming machine 522 is operational at a current location 524. In accordance with the present disclosure, the gaming analytics computing system 500 can determine a performance prediction at the current location 524 based on a current configuration of the existing gaming machine 522. Using the data analytics techniques described above, the gaming analytics computing system 500 can also predict performance of the gaming machine 522 if placed at a hypothetical location, shown as gaming machine 528 at a hypothetical location 528. Based on the performance prediction of the existing gaming machine 522 at the current location 524 and the hypothetical location 528, the gaming analytics computing system 500 can cause to be displayed on an interface a recommendation 544. The recommendation 544 can be, for example, to relocate the existing machine 522 to the hypothetical location 528. The recommendation 544 can include a quantification that supports the decisioning behind the recommendation.

Referring now to FIG. 6, a gaming analytics computing system 600 is shown, which can be similar to the gaming analytics computing system 100 of FIG. 1. As such, it can have one or more processors 602 and one or more computer memory units 604. The gaming analytics computing system 600 can also include a database 606, which can include the databases illustrated in FIG. 4A, for example. The gaming analytics computing system 600 can also have an application server 608 and/or a web server 610.

The gaming analytics computing system 600 can be associated with a gaming environment 620, within which gaming devices are operational. As shown, an existing gaming machine 622 is operational having a particular configuration. The gaming analytics computing system 600 can determine a performance prediction for the existing gaming machine 622 based on its configuration. In accordance with the present disclosure, the gaming analytics computing system 600 can determine, for each of a plurality hypothetical gaming machines 626A-C having varying configurations, a performance prediction. Based on an assessment of the performance prediction of the existing gaming machine 622 and the performance prediction of each hypothetical gaming machine 626A-C, the gaming analytics computing system 600 can cause to be displayed on an interface a recommendation 644. The recommendation 644 can be, for example, to replace the existing machine 622 to with a gaming machine having the same configuration as one of the hypothetical gaming machines 626A-C. The recommendation 644 can include a quantification that supports the decisioning behind the recommendation.

The systems and methods described herein can utilize an intuitive interface that is supported by natural language processing and artificial intelligence. As described, based on the predictive analytics, operational recommendations can be provided by the system through the interface to allow casino operators to improve service players, drive loyalty, increase profits, and improve cost savings. In some implementations, the interface provides reporting capabilities, as well as projections, predictions, and recommendations designed to best improve operational key performance indicators.

FIGS. 7-14 provide example non-limiting interfaces 740 that can be presented by a gaming analytics computing system 700. The gaming analytics computing system 700 can be similar to the gaming analytics computing system 100 of FIG. 1. As such, it can have one or more processors 702 and one or more computer memory units 704. The gaming analytics computing system 700 can also include a database 706, which can include the databases illustrated in FIG. 4A, for example. The gaming analytics computing system 700 can also have an application server 708 and/or a web server 710.

Figure 7:
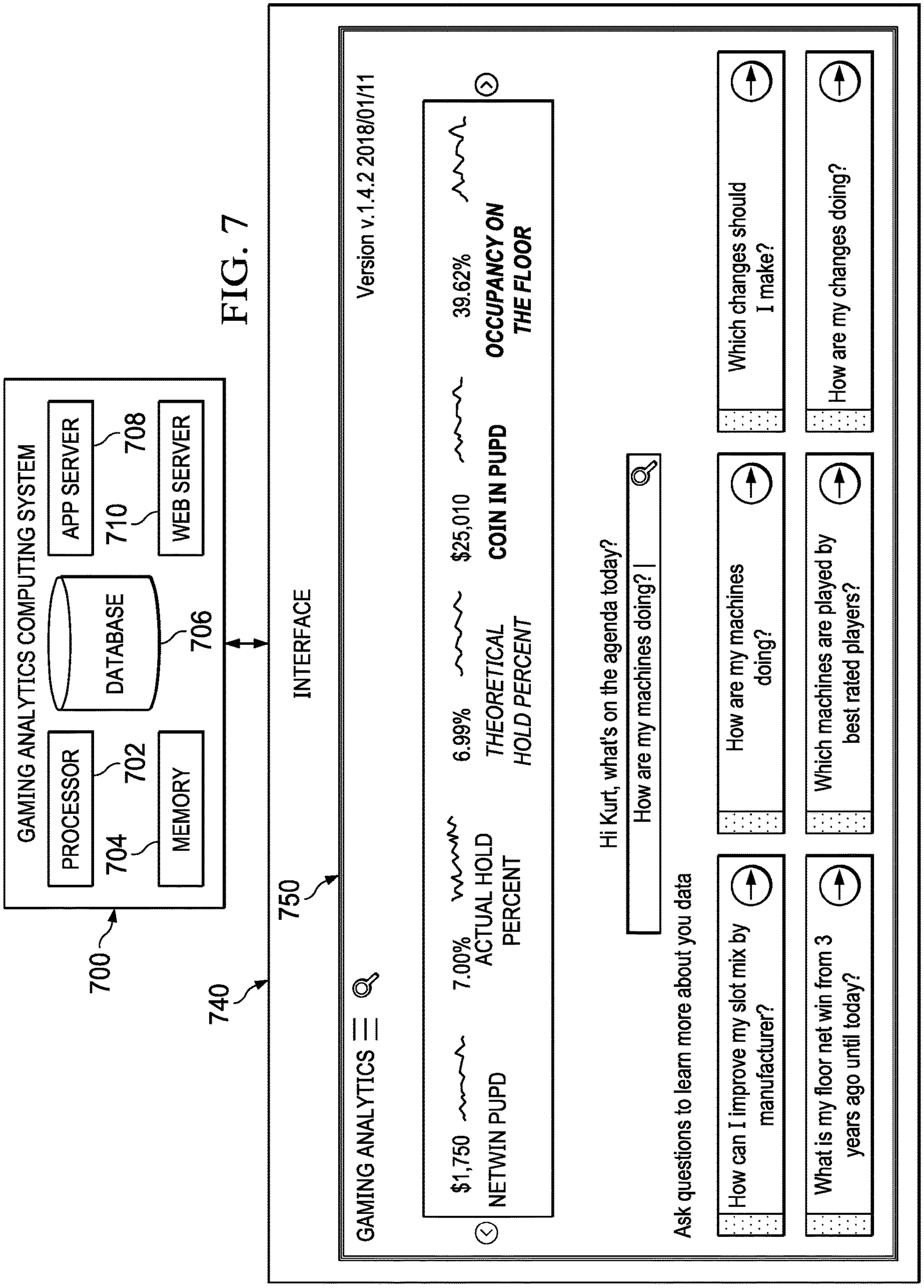
FIGS. 7-14 depict example non-limiting interfaces that can be presented by a gaming analytics computing system according to various embodiments.
Figure 8:
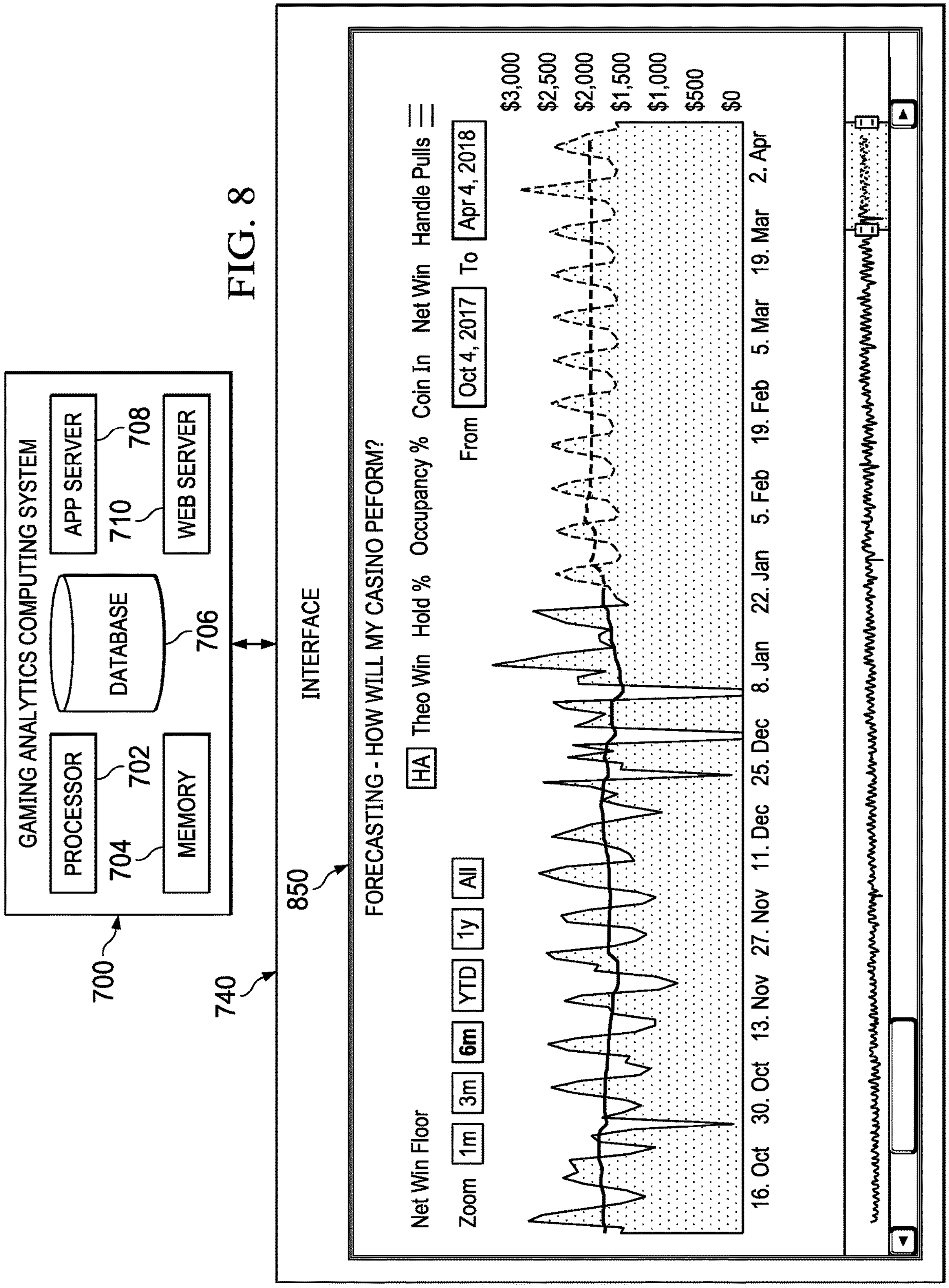
Figure 9:
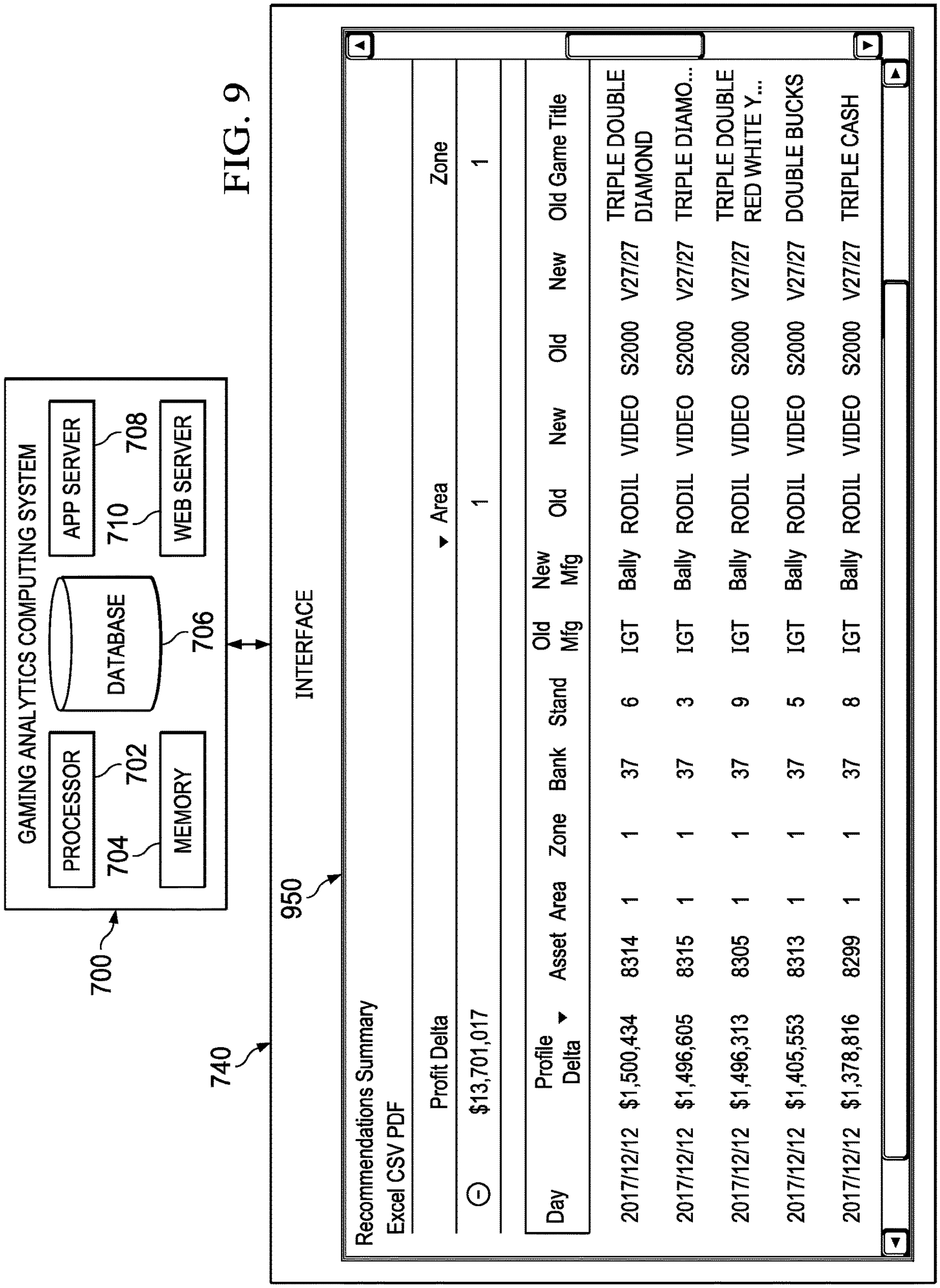
Figure 10:
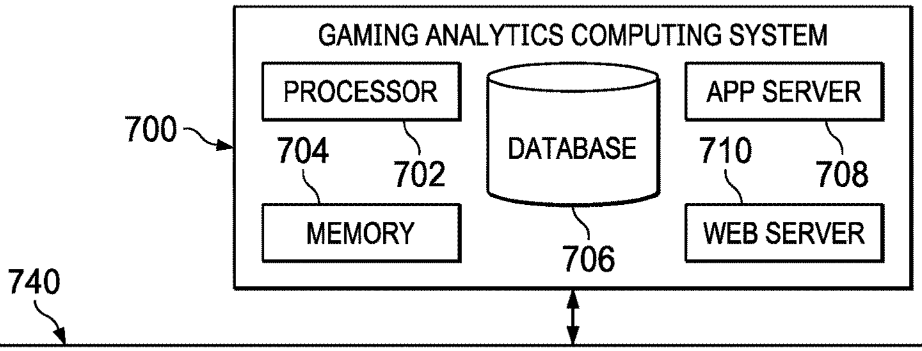
Figure 11A:
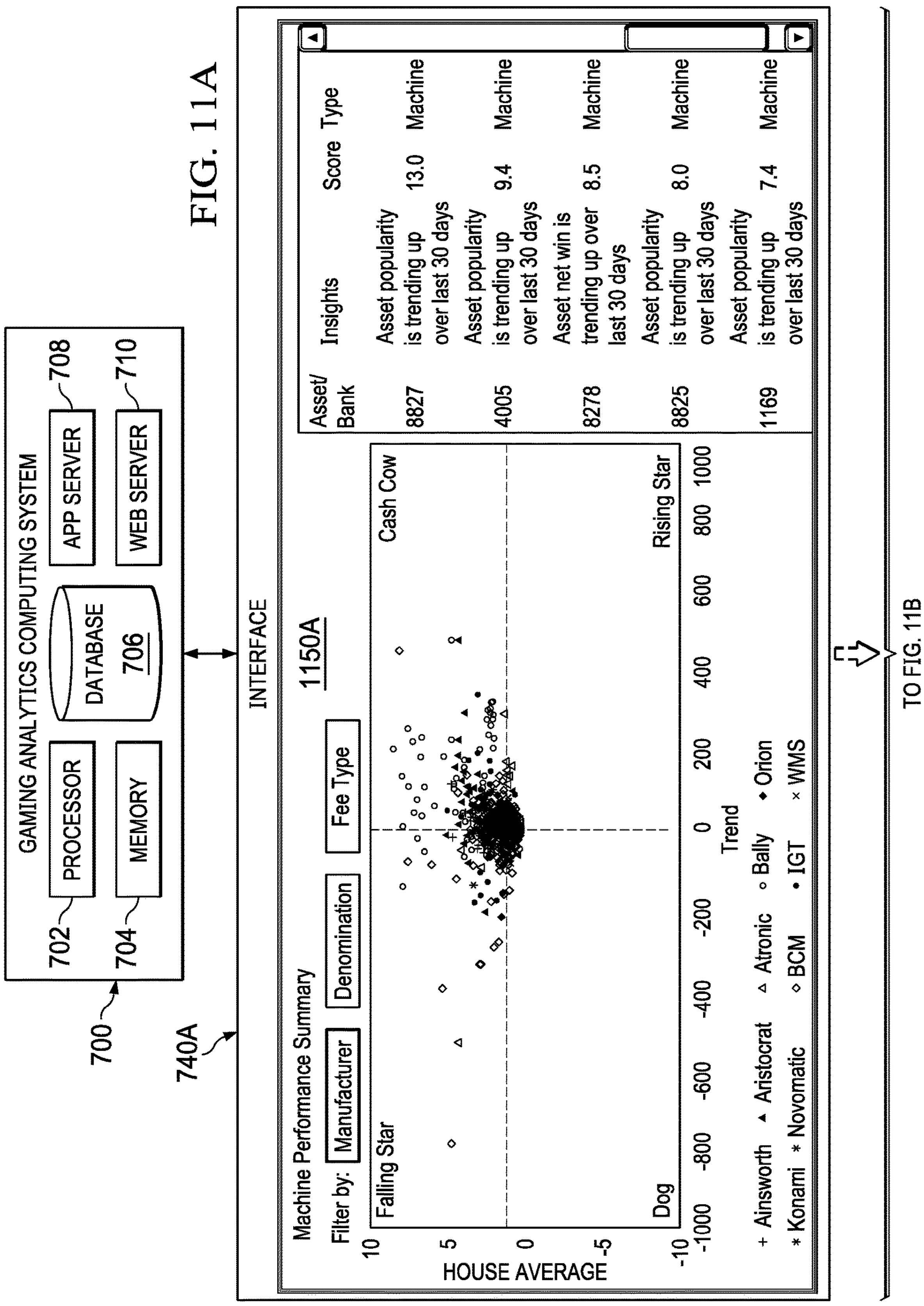
Figure 11B:
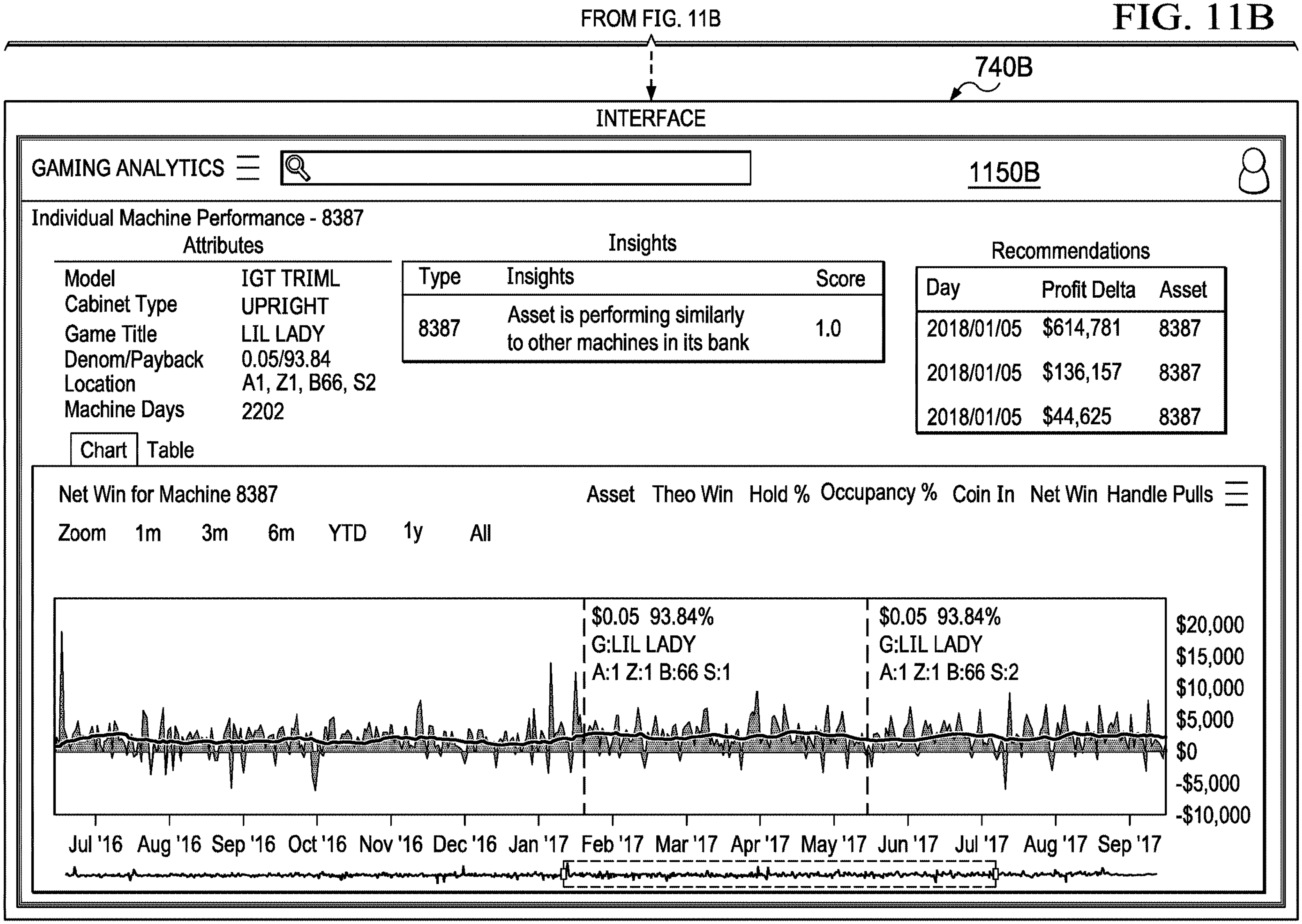
Figure 12:
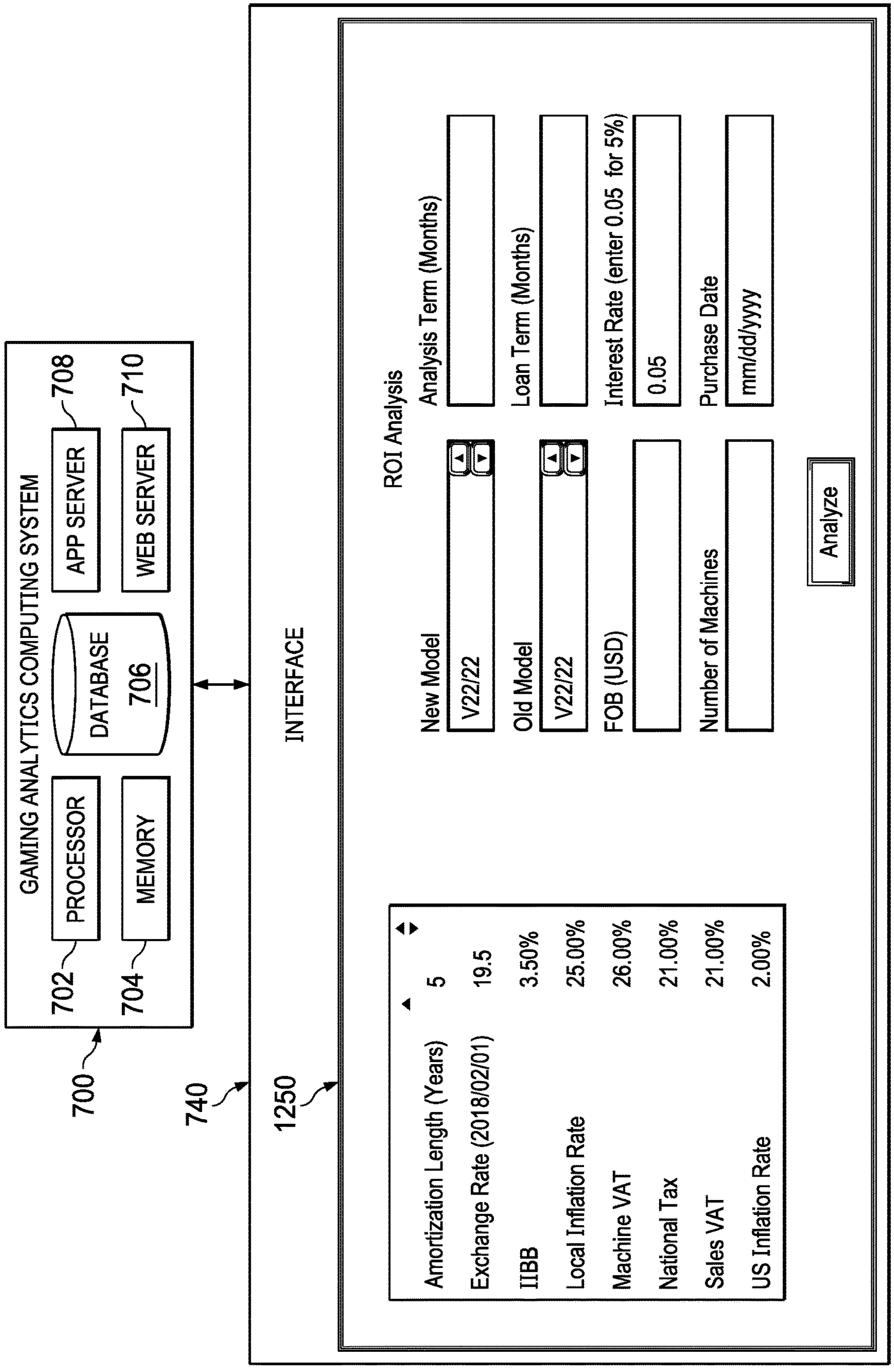
Figure 13:
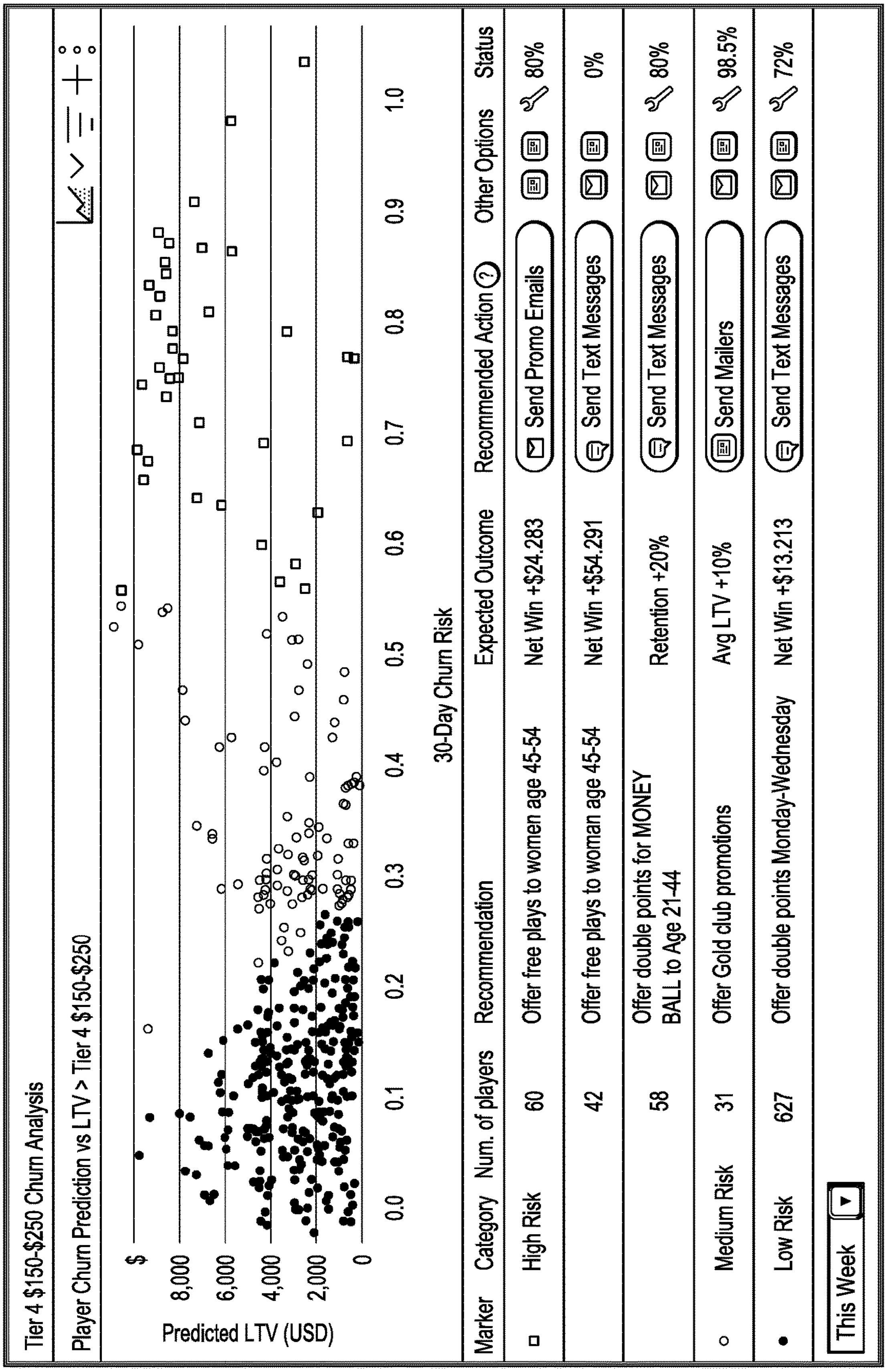
Figure 14:
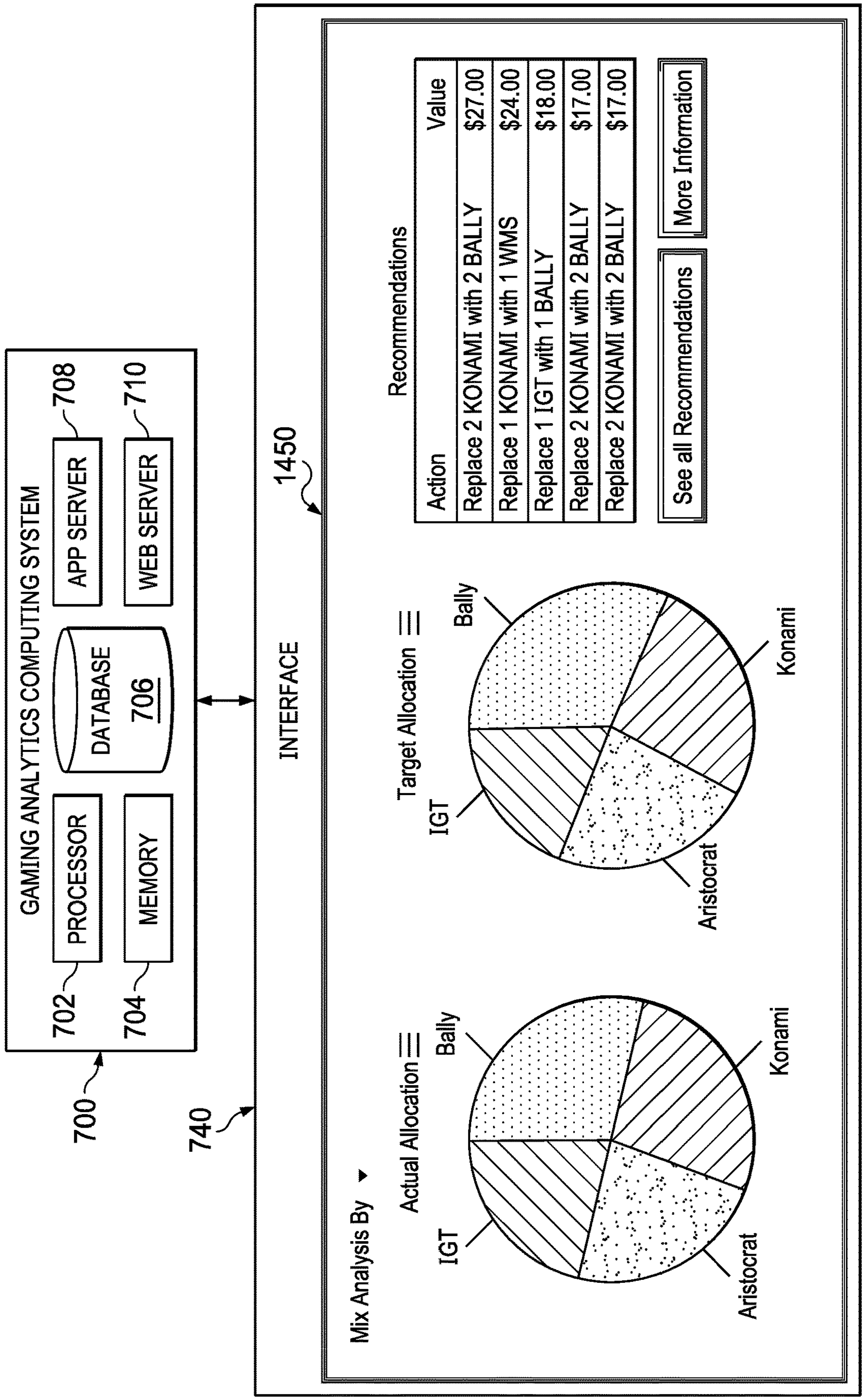

FIG. 7 depicts an example home screen 750 for a user that is generated by the gaming analytics computing system 700. The home screen 750 can include one or more pre-loaded questions to aid the user in navigating the system. The home screen 750 can also receive natural language queries entered by a user into the search bar. FIG. 8 depicts an example forecasting screen 850 generated by the gaming analytics computing system 700. Based on the data analytics described herein, various events can be forecasted, such as theoretical win, hold percentage, occupancy percentage, coin in percentage, net win percentage, and handle pulls. FIG. 9 depicts a recommendation summary 950 informing the user as to which operational adjustments are recommended. FIG. 10 depicts a change analysis 1050 generated by the gaming analytics computing system 700. FIG. 11 depicts an example machine performance summary 1150A on the interface 740A that is generated by the gaming analytics computing system 700. As shown by the interface 740B, a user can drill down to receive an individual machine performance summary 1150B. FIG. 12 depicts an example Return on Investment (ROI) analysis 1250 that is generated by the gaming analytics computing system 700. FIG. 13 depicts an example marketing analysis 1350 that is generated by the gaming analytics computing system 700. FIG. 14 depicts an example gaming machine mix allocation that is generated by the gaming analytics computing system 700.

In accordance with various embodiments, the presently described systems and methods can be used to predict player churn utilizing various models, such as a logistic regression Monte-carlo (LRMC) model, or other suitable models. The presently described systems and methods can be used to perform player lifetime value (LTV) predictions, as well as determine at risk players and provide for improved player segmentations. Based on such modeling, each player during their lifetime exhibit different attributes and behavior and at different stages. Promotions recommended in accordance with the present disclosure can be tailored to player preferences. For example, a particular player can be given free drink coupons on weekdays since he is a frequent weekday player that responds well to dining promotions. Personalized promotions considering player's current status and past behaviors can be the most productive at satisfying different player's interests. Promotion management in accordance with the present disclosure represents a few major player features for deciding marketing strategies: Promotions in accordance with the present disclosure can be provided to players in real-time based, at least in part, on real-time player data. Lifetime Value Predictions, Player Lifecycle Management (PLM), Survival Analysis, Player Constraint, Player Luck and "RFM" (recency, frequency, and monetary value) Analysis.

On a group level, players sharing common patterns can be grouped for analysis. These groups are generally referred to as "segments". The focus of each segment is different and needs an appropriate strategy to achieve the end goal. Marketing campaigns can be targeted at a group of players that have similar features or needs in order to maximize reinvestment rate. A gaming analytics computing system as described herein can provide logical and doable strategies and actions to meet various goals, such as converting loyal medium-spending players to high-spend players, retaining churned players, re-engaging high-risk players, and reactivating inactive players.

A gaming analytics computing system in accordance with the present disclosure can analyze all past marketing strategies like offers, free play etc., to determine the effectiveness of each strategy in increasing the Return of Investment (ROI), and combine player segments data with all metrics. Recommendations can be provided by the gaming analytics computing system to casino operators with optimum options to increase player retention, reduce cost, and maximize ROI, for example.

Figure 15:
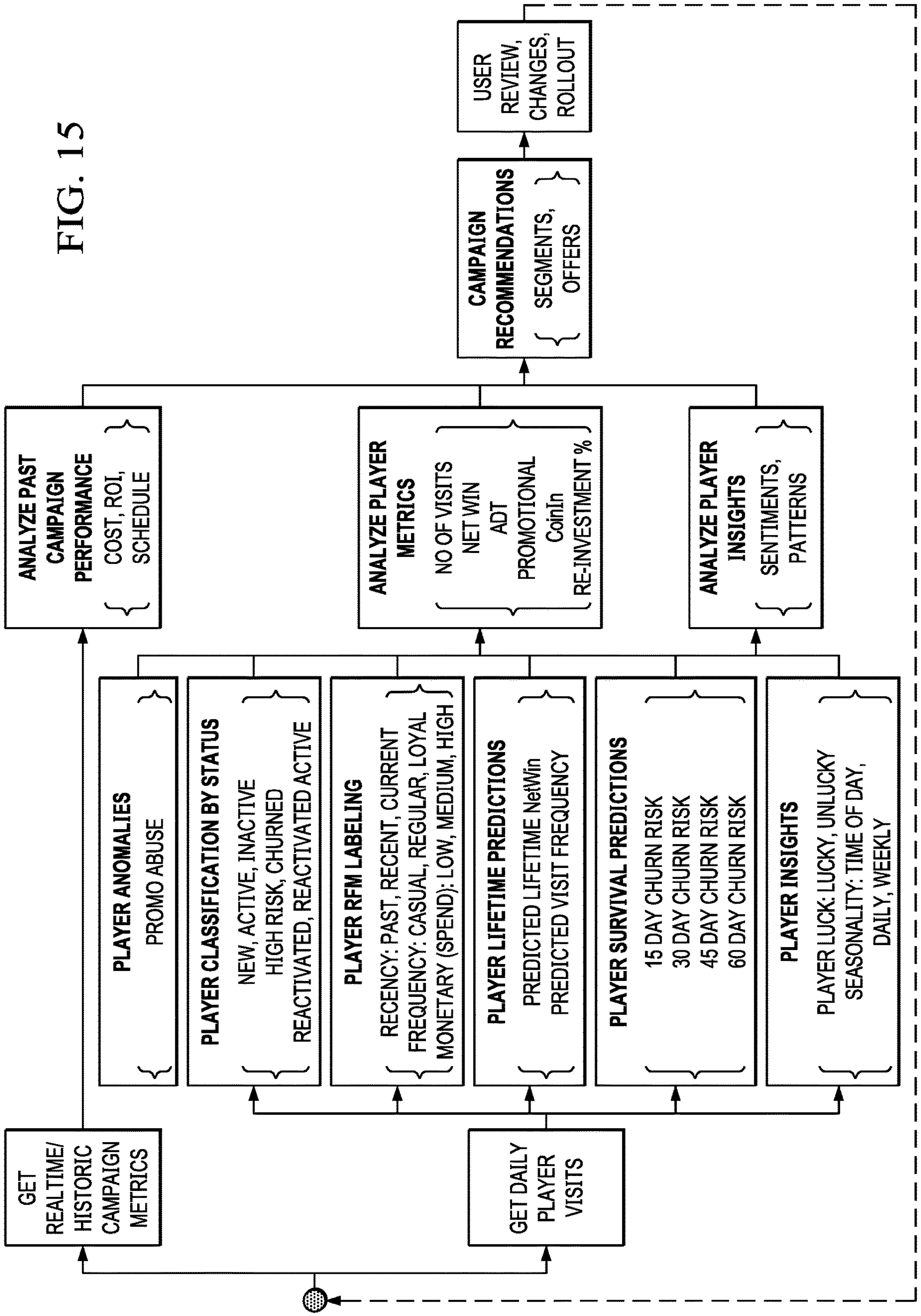
FIG. 15 depicts an example life cycle of player data analysis and recommendation generation in accordance with one non-limiting embodiment.

As described below, a gaming analytics computing system in accordance with the present disclosure can analyze data (i.e., players data, marketing data, and so forth) to derive deep insights and use them to provide effective promotional recommendations. FIG. 15 depicts an example life cycle of player data analysis and recommendation generation.

A gaming analytics computing system in accordance with the present disclosure can start tracking players from the time they register with the casino. Player visits can be recorded and monitored daily. Visit data can include critical metrics like, Coin In, Net Win, Theoretical Win, Number of Sessions, Average Time spent to slots, Promotional Coin In, Expenses, Average inter-visit duration, and so forth. Other player metrics that can be utilized can include, without limitation, distance to casino, player expenses, number of handle pulls/game plays, games won, games lost, jackpots, game titles, gaming machine model, denomination, average bet, number of unique games played, visit start date/time, visit end date/time, % money/% time spent on various games during a visit. Other player metrics that can be utilized can include, without limitation, income level, spending habits, shopping habits, wallet size, among other demographic and financial related metrics. These metrics can be aggregated and stored per player per day. This data can serve as the primary source for all downstream data analysis.

Player Status Classification, as shown in FIG. 15, relates to a process that determines the status that the player belongs to on a given day. Based on past and current visit patterns a player can be classified, for example, into one the following categories on a given day: New Players, Inactive Player, Active Players, High Churn Risk Players, Churned Players, Reactivated Players, and Reactivated Active Players. FIG. 16 depicts an example interface presented by a gaming analytics computing system showing metrics by player status classification in accordance with one non-limiting embodiment.

Player status can be tracked per player day, so at any given point in time casinos can go back in time and look at how the player transitioned across states, and also reason out why they transitioned. FIG. 17 depicts an example interface presented by a gaming analytics computing system showing players classified by status in accordance with one non-limiting embodiment.

Figure 18:
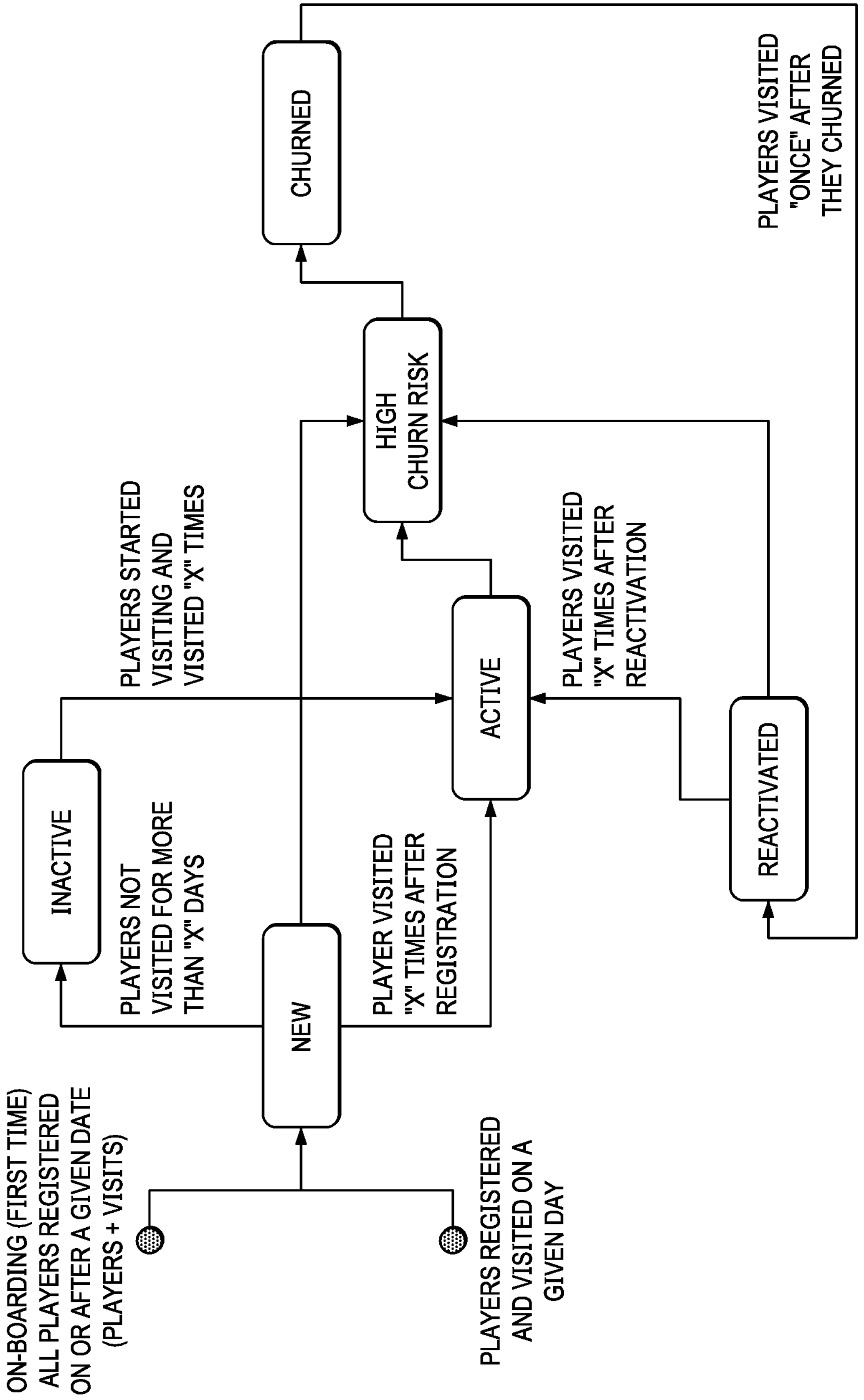
FIG. 18 depicts an example of how players can move from one state to another.

The player status classification can be performed on two separate occasions, for example. First, it can be performed when any player of casino is on-boarded the first time and then subsequently daily. Second, it can be performed when there is an update in the user interface presentation or update to the background algorithm concerning PLM. During on-boarding, players can be classified as New, Active and Inactive players. Then each day players can be classified as New, Active, Player Churn Risk, Churned, Reactivated and Re-activated Active. In accordance with the present disclosure, players can move from any state to any state over their player lifetime. FIG. 18 depicts an example of how players can move from one state to another. Each state depicted in FIG. 18 is described in more detail below.

While on-boarding, a specific date can be considered to be the first date from which all player data and transactions from any source player tracking system are transferred to a platform in accordance with the present disclosure. All players who have registered on or after the given date and have visited the casino at least once can be marked as "New" players. On a daily basis, all players who registered on that day can be marked as "New" Players. All registered players who did not visit the casino in the last "n" months can be marked "Inactive". The value for n can vary based on the amount of historical data available for a particular casino, for example, or based on other parameters. In some implementations n=4 months, whereas in other implementations n=8 months, n=12 months, among other periods of time. This classification can run only during the on-boarding process, for example.

All New Players and Inactive Players who visited the casino at least n times can be marked as "Active" players. In some embodiments, the value for n is set to 4, but this disclosure is not so limited. Instead, n can be set to any suitable value. While on-boarding or during daily imports, all current New Players and Inactive Players as on that day who visited more than n times can be marked as Active Players.

Since casino gaming is a non-contractual business, it is important to carefully define churn status (i.e., whether a player stopped visiting the casino). The gaming analytics computing system in accordance with the present disclosure analyzes the past visit pattern of players and can determine the day the player churned (i.e., the churned date).

Different from traditional chum labeling where players absent for a certain fixed number of days (commonly 90-180 days) are marked churned, advanced churn labeling in accordance with the present disclosure takes account of a player's visiting patterns to define a player's churn status. In this regard, players can be segmented into groups according to their number of visits. Example groups are provided below.

Group 1: One time players. This group can be for players that only visited the casino once. Moreover, if their last visit was over a defined period of time (e.g., 180 days), they will be considered churned.

Group 2: Frequent players. This groups can include players that visited the casino more than or equal to 5 times (or other suitable number of times). Chum status in this group can be calculated using players inter-visit duration $\delta$. For each player, $\delta_i$ is defined as the date difference between the player's i−1st and the ith visits. EQ. 24 can be used to determine mean:

$$\bar{\delta} = \frac{1}{n}\left(\sum_{i=1}^{n} \delta_i\right) \qquad \text{EQ. 24}$$

EQ. 25 can be used to determine standard deviation:

$$s = \sqrt{\frac{\sum_{i=1}^{n} (\delta_i - \bar{\delta})^2}{n-1}} \qquad \text{EQ. 25}$$

The upper limit of inter-visit duration can then be determined. In one example embodiment, the maximum absence before marked churned is the upper limit adding an extra two weeks (or other suitable time period) to compensate for possible out-of-town vacation time, and so forth. If a player fails to show up for the number of days, m, as determined by EQ. 26 the player can be classified as churned.

$$m=\bar{\delta}+1.96*s+14 \qquad \text{EQ. 26}$$

Group 3: Infrequent player. Any player that showed up more than once but less than 5 times can fall into this group. A player can be classified as churned if the player's inactive days (duration from the last visit date to present date) are longer than the player's active days (duration from first visit to the last visit).

In accordance with the present disclosure, player churn risk can be determined. All New, Active players who visited in the past 6 months with a high churn probability can be marked by their churn risks. With player churn status defined, a player's risk of churning can be predicted using a suitable algorithm. In one embodiment, a high speed and high accuracy decision-tree-based ensemble algorithm can be used for chum risk prediction.

To create training data set, the first step is to label churned players using the advanced churn labeling approach described above and using the labels as training targets. The training features can include three major aspects namely, (i) demographic information including age, gender, club level, distance to the casino; (ii) visiting pattern including number of visits, average inter-visit duration, account age etc.; and (iii) aggregation of player gaming stats including total coin in, total promotions redeemed, total time on device etc. The prepared data can be randomly split into training and testing data sets. Non-limiting examples of training features can include, but are not limited to:

Gender: female, male, unknown, etc.

Player age: integer number indicating player's age

Club level: player level according the casino's ranking system

Account age: duration between player's first record available in the data set (FRA) and current date Inactive duration: duration between player's last visit to current date Visit counts: Number of visits since FRA to current date Promo counts: Number of promotions used since FRA to current date Used promo: if a player ever used promotions since FRA to current date Average Delta: average inter-visit duration since FRA to current date Total coin in: sum of coin in amount since FRA to current date Total time on device: sum of time on device since FRA to current date Total promo: sum of promotion value used since FRA to current date Additional features can include, but are not limited to itemized expenses (i.e., detailed expenses the casino spent on player, such as types of promotions including food and dining, free play etc., and promotion amount in term of money); responsive promotion type (i.e., each player's preferred type of promotions); and seasonality (i.e. players visiting pattern's seasonality, if applicable). Other attributes or features used in the training data can include, for example, distance to casino, number of handle pulls/game plays, games won, games lost, jackpots, game titles, gaming machine model, denomination, average bet, number of unique games played, visit start date/time, visit end date/time, % money/% time spent on various games during a visit.

The model with different hyper-parameters can be trained with player features against churn status using the training data set. The trained models can predict using the testing data set and compare the prediction with the real target values to measure the models' performance. Hyper-parameter tuning that is guided by testing the accuracy of the results and recall value, the best model can be saved and used for predicting player churn risks.

To prepare data for prediction, for each day the module can update and calculate player features the same way training features are constructed. Using the player features from the previous processing step, the saved model can predict the probability that a player is going to churn. The probabilities can be classified to three levels, low, medium and high, indicating the risk of the player leaving the casino.

Still referring to FIG. 18. Reactivated Players include all players that came back to the casino subsequent to being labeled as "churned." The system can retrieve the list of all the players that were labelled as churned on a given day, retrieve the visits of all players on the same day, and check whether any churned player made a visit on that day. A churned player with a visit can be labeled a "reactivated" player.

All Re-activated players that visited the casino "n" times after they were labeled as "reactivated", can become active players again. The number of visits for a reactivated player to become active again is set to any suitable number. In one embodiment n=4, although n can be set to any value depending on each casino's player visit data.

Figure 19A:
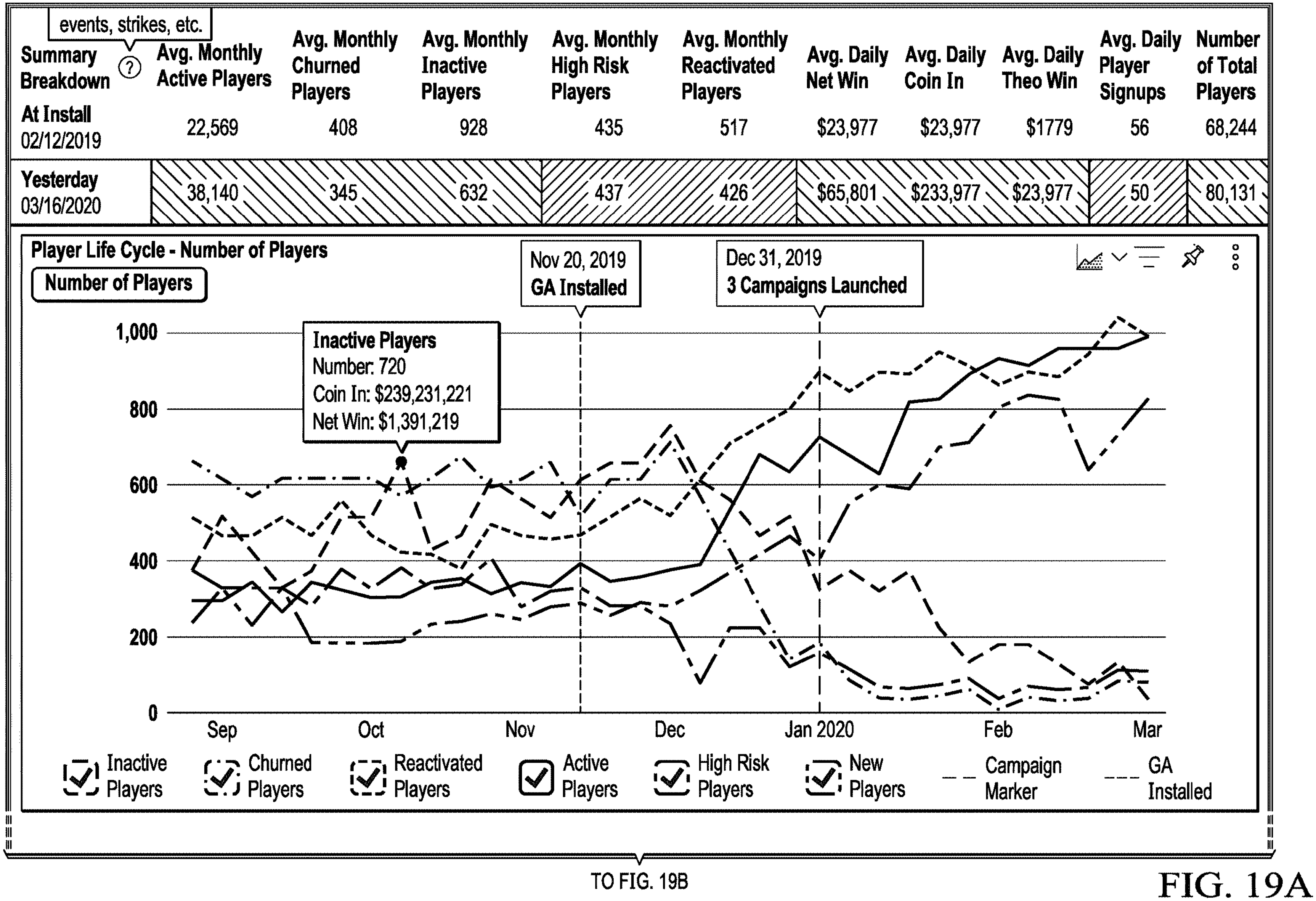
FIGS. 19A-B depict an example interface that correlates trends from status metrics and events in accordance with one non-limiting embodiment.
Figure 19B:
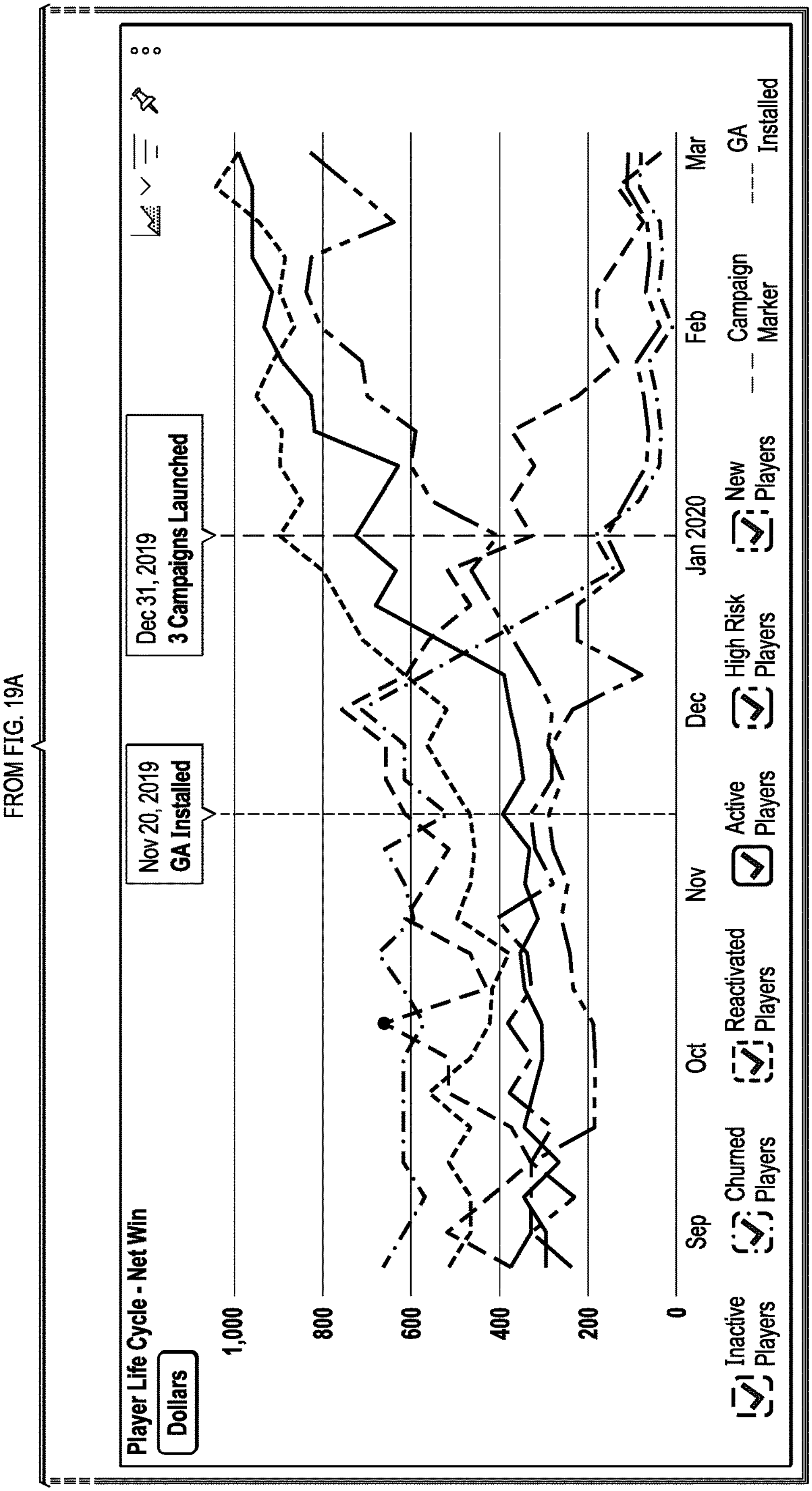

Movement of players from one status to another can be triggered due to various reasons. A low spend player could turn into a high trend player because she had a great experience, for example. A loyal player could become high risk player and eventually churn because of continued loss. Tracking each player status (i.e., segment) and their metrics every day in accordance with the present disclosure can give casinos an opportunity to spot alarming or favorable trends early and take necessary action. By way of example, a sudden surge in high risk players could be a pointer to the marketing team to reach out players to understand the problems and fix them, before they permanently loose them. FIGS. 19A-B depicts an example interface that correlates trends from status metrics and events.

There could be events that lead to positive trends. For instance, a successful month-long campaign can lead to conversion of in-active players to active players. Such events can be repeated frequently. The platform in accordance with the present disclosure allows the connecting of trends and events to provide data-backed, meaningful insights to casinos. Using such insights, casinos make informed decisions.

Referring now to lifetime value predictions, a lifetime value model in accordance with the present disclosure is a neural network model that considers each player's past visits pattern and statistics to predict players' frequency and net win value for the next 2 years, or other period of time. The module can collect a casino's current player base, extract players' demographics information, and aggregates their recent performance. In some embodiments a deep learning model is utilized to predict their frequency and net win value for the next 3-month window. The prediction can be extended to the next 2 years by adding up discounted 3-month window predictions along time.

Figure 20:
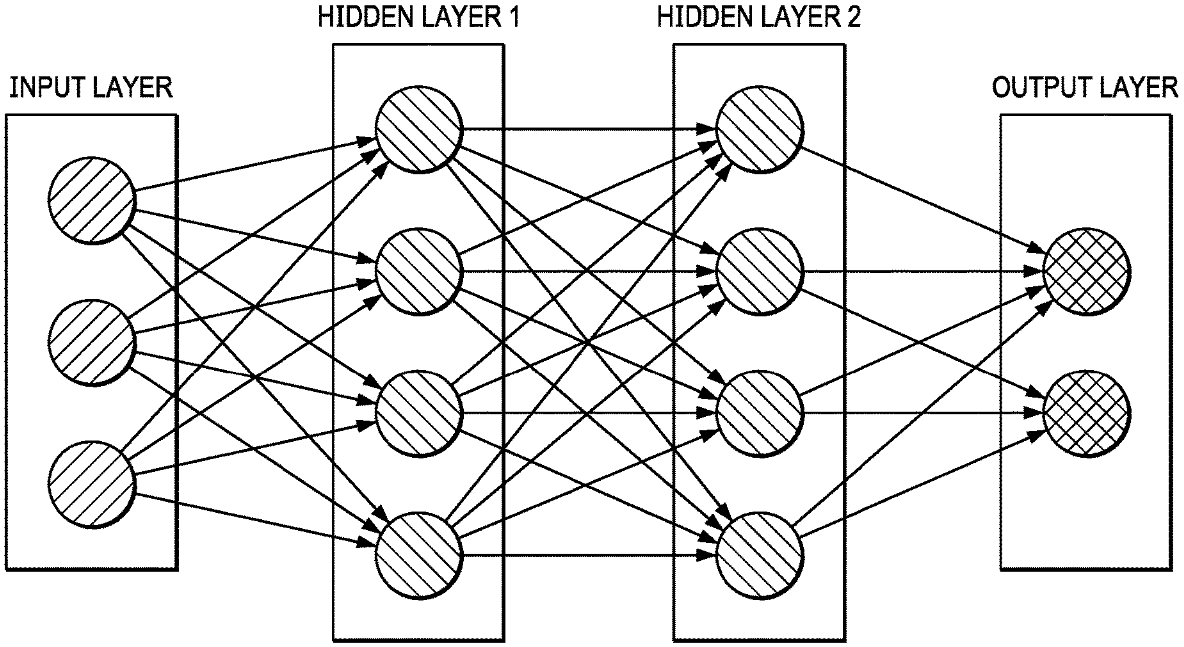
FIG. 20 schematically depicts an example neural network in accordance with one non-limiting embodiment.

As is to be appreciated by one skilled in the art, a deep learning model is built with layers. When deep learning neural network is initialized, all nodes from inputs to hidden layers to outputs are connected, forming a network. Weights will be assigned to connections between nodes (neurons) of adjacent layers. FIG. 20 schematically depicts an example neural network. Each hidden layer in the neural network is a dense layer with a activation function. Hidden layer $H_i$ takes training data or output from the last layer as input $I_i$, and initial assigned weights $W_i$ to calculate neurons using specified activation function, such as ReLU, shown in EQ. 27.

$$H_i=\text{ReLU}(I_i*W_i+\text{Bias}_i) \qquad \text{EQ. 27}$$

After all hidden layers are processed, the output layer n uses activation function (eg. softmax) on the last hidden layer value $H_n$ and weights $W_n$ to calculated an initial output, shown in EQ. 28.

$$\text{Output}=\text{softmax}(H_n*W_n+\text{Bias}_n) \qquad \text{EQ. 28}$$

The model can compare the output from the last step with the real target value, and back track to adjust weights and biases of hidden layers according to the residuals. The model repeats the above steps with adjusted weights and biases until residuals reaches the global minimum.

The data used for training the model can be the players' visit records from the last 27 months (or any other suitable timeframe). In one embodiment, the data can be broken into two parts. A first period of time in the record (such as the first 12 months, 24 months, or 36 months, depending on data, for example) can be used to construct training features. Similar to player churn risk classification's training features to predict a lifetime value of the players, the model can manipulate data and create a data set with rows and columns, where each row represents each player with demographic information, visiting patterns, and aggregated gaming stats. Example features that are used can include gender, player age, club level, inactive duration, visit counts, account age, promo counts, used promo, average delta, total coin in, total time on device, total promotion, distance to casino, number of handle pulls/game plays, games won, games lost, jackpots, game titles, gaming machine model, denomination, average bet, number of unique games played, visit start date/time, visit end date/time, % money/% time spent on various games during a visit. The last 3 months of data (or other suitable period of time) can be used to create predicting targets, frequency and monetary value (net win). The prepared data can be split into training and testing data sets for model selection.

The models in accordance with the present disclosure can have 5 layers, in the order of Dense Layer with ReLU as the activation function, Dropout Layer, another Dense Layer with ReLU as the activation function, another Dropout Layer, and a final Dense Layer as output. The models can use mean square error as loss function.

Models with different combinations of parameters vary in performances. To select the best models a series of models can be built using parameter combinations, and then trained against training data and targets. LTV models' performances can be measured in consideration of a few metrics, besides the common mean square error used for regression problems and the overall accuracy of predictions. For example, for player i in the testing data set with actual last 3 months frequency $a_i$, the model predicts frequency $p_i$, the frequency accuracy $ACC_f$ of the model is calculated, as shown in EQ. 29:

$$ACC_f = \frac{\sum_{i=1}^{n} p_i}{\sum_{i=1}^{n} a_i}. \quad \text{EQ. 29}$$

This metric can be introduced to help the casino's overall budgeting purpose. Together with mean square error, the models performance is evaluated at both the player level and the casino level. Each model's metrics can be calculated and ranked. The model that has both metrics lead in ranking can be selected and saved. The model can then be updated by repeating the last two steps every other month, for example, to keep the models fresh and accurate.

Every day, the module can collect the players last two years of records and manipulate it into the same format as training data. The saved models can use the data to predict these players' next three months frequency and net win.

To extend 3 months prediction $pred_3m$ to 2 years (or any other configurable time period), an anticipated decline along time can be accounted for by breaking 2 years of data to 3 month windows. Each window uses a discounted $pred_3m$ value. There are at least two kinds of discounted rates that could be applied. A first approach is to use a set of hard coded rates for estimation. For example, each window is discounted by 0%, 10%, 20%, 30%, 40%, 50%, 60% and 70%. The 2 years prediction is the sum of all eight discounted windows. A second approach is to generate discounted rates using survival analysis.

For a casino to plan out actionable strategies, timing always plays an important role. When it comes to keeping or retaining customers, insight into a player's time until churn event can be the key to plan out marketing moves. Survival Analysis can be used to predict time until event probabilities.

Using Survival Analysis helps in answering questions regarding the probability that an individual will churn in a certain amount of time, (e.g., 30 days, 2 months, and so forth), the length of time an individual stay as a customer, and identify which segment of players have higher churning probability than others. In some embodiments, random forest can be used for building a risk prediction model in survival analysis. The progress for building a random survival forest model can be similar to the Churn Risk model and LTV model. The difference is while for LTV, each model only takes one predicting target (either net win or frequency), but for RSF model, two targets are required, which are account age (indicating surviving time) and churn event (indicating the occurrence of the interested event).

Survival analysis generally follows similar data preparation pipeline as Lifetime Value, described above and an example survival analysis workflow can include collecting players' demographic information and aggregating gaming stats, including but not limited to: gender, player age, club level, inactive duration, visit counts, promo counts, used promo, average delta, total coin in, total time on device, total promo. Here, account age is used as target instead of a training feature. The second target is the churn event using advanced churn labelling. The prepared data can be randomly split into training and testing data. It is noted that player data can be collected and monitored in real-time, periodically (i.e., twice a day, daily, etc), or intermittently, for example.

Similar to LTV, a series of models with combinations of parameters can be trained. To select the best model, C-Index is the assessment of models, wherein the closer C-Index is to 1, the better the model is for predictions. A trained RSF model in accordance with the present disclosure can take players' features and time duration t to predict each player's staying probability at time t from the day the player joined the casino. As such, extra attention may be needed to get accurate predictions as of the current date. For example, to get the predictions for the next 30 days from today, the module checks the player's account age t, and set predicting time duration t=i+30. The saved model can take the same features of non-churned players as training data, and predicts players' staying probability for the next 30-180 days.

In accordance with various embodiments, the platform can determine "value at risk" (VAR), which is the amount of money that is at risk for the casino operator. More specifically, this is the amount the casino is likely to lose if no action is taken against players that have high Predicted Lifetime Value with high probability of Churn Risk. VAR can be determined based on the life time value (LTV) prediction multiplied by churn risk (15, 30, 45 etc.). VAR is one of the critical indicators to casinos for narrowing down their focus on players and target them for their marketing activities.

Referring now to player constraints, players have different playing styles and budgets. While money is the most common constraint where a player sets a budget, a player's time budget can be taken into consideration as well. The player constraint module can classify players as time and/or money (i.e., wallet) constrained using their visit records of the last few months. The following approach can be used to classify constraint players.

The last n months player's time-on-device record can be collected for time budget, and bill-in record for money budget. In some embodiments, the default value for n is 4-6 months, as shorter duration may not give enough information on player budget and longer duration may fail to capture players' most recent behavior).

Next, players who visited less than a certain threshold of times, such as 3 times, 5, times, or 10 times, for example, can be filtered out to provide for better estimation. In some embodiments, the threshold can be based amount of data available for a particular casino, for example. For each selected player, the fluctuation of his/her money and time spent is measured. The most common measurement of fluctuation is the variance a of the target. But this method usually favors groups with small numbers. To overcome this, a new measurement of fluctuation f can be introduced and applied to both time and money targets for eligible players. For each player, f is the variance of money/time spent $x_i$ weighted by the mean, as shown in EQ. 30.

$$f = \frac{\frac{\sum_{i=1}^{n}(x_i - \bar{x})^2}{n-1}}{\frac{1}{n}\left(\sum_{i=1}^{n} x_i\right)} \quad \text{EQ. 30}$$

The players can be ordered by f; and the smaller f is, the tighter budget a player has.

In accordance with the present disclosure, two ways can be used to classify what constraint a player belongs to. The first approach is to separate the constraints. For each constraint, a portion of the players with low f values (usually top 20%-30% depending on the casino) can be selected and marked as constraint players. The second approach is to classify which constraint a player leans more towards using the ratio between money budget f value $f_m$oney and time budget f value $f_t$ime. A logistic transformation can be applied to the ratio to limit the range between 0 and 1 as constraint score Sc, as shown by EQ. 31.

$$S_c = \frac{1}{1 + e^{-x}} \quad \text{EQ. 31}$$

Referring now to Recency, Frequency and Monetary (RFM) analysis, such analysis is quite effective when it comes to business and customer marketing. Recency, frequency, and monetary respectively measure the duration of a player's last visit to current date, the total number of visits, and the amount of value the player brought into the casino. In accordance with the present disclosure, RFM scores and classifications can be calculated using records from the most recent year with the following steps.

First, RFM values for all the players visiting within a year of the current date can be collected and aggregated. The KMeans clustering algorithm can be applied to each aspect of RFM to separate players into groups according to the values. K-Means' flexibility of grouping by relative Euclidean distance outperforms traditional hard-coded threshold using number or percentile, because this application requires minimal human input on determining the optimal threshold for each casino. For recency and frequency, the KMeans algorithm can be directly applied because the population distributions have certain upper limits when only one year of data is concerned. For monetary values, however, the range could be stretched and there might be negative values (e.g., the casino lost money), which could be taken care of by assigning the lowest possible score. With high value outliers, KMeans tends to classify them into a small group, which fails to distinguish groups within lower values that have higher density. To address the problem, the KMeans algorithm can be used twice. The first time is to identify the high value outliers, which will be assigned the highest score. The second time it can classify the remaining values to more meaningful groups.

With all the RFM scores set up, the scores can be translated to plain language in order for casinos to make informed decisions. In one embodiment, low, medium and high RFM scores in ascending order are connected to English words as stated below:

Recency: past, recent, current

Frequency: casual, regular, loyal

Monetary: low spending, medium spending, high spending

Each player can be associated with a phrase reflecting his/her RFM status. For example, one player may be a "past, regular, medium spending player," while another player is a "current, loyal, high spending player."

As is known in the art, casino gaming involves the thrill of wins and losses. But when a player consistently has unlucky games, it would possibly result in the player leaving the casino due to bad experience. In accordance with the present disclosure, in catching a player's bad days, the casino can offer their hospitality to prevent the players from leaving. Thus, promotions for a particular player can be determined and offered in real-time, even as the player is playing at a game or at least still on the casino's property.

The platform disclosed herein can use a casino's hold as the baseline for a player's possible loss. By comparing how much a player's real loss with the baseline, how fortunate the player was can be assessed. The platform can avoid defining a player's luck solely using the player's own gaming history. In this way the bias from players of different behavior groups is minimized. By way of example, if using a player's history and selecting the highest losses as unlucky experiences, players with a few visits are much more likely to be marked unlucky more often than the players with hundreds of visits. To overcome the bias, luck can be measured daily in relation to each day's player base, as described in the workflow below.

Players can be ordered everyday by baseline loss $b_l$, which can be "Theo Win" in the perspective of the casino data. The players with the top 50% in predicted losses can be selected. This filter can be used as the players playing little money are more likely to lose. If these players are included in the data set, they will be more favorable as unlucky. For the selected players, actual loss $r_l$ can be indicated by Net Win in the perspective of the casino data. To determine the relative loss for each player, loss ratio $l_r$ is calculated based on EQ. 32:

$$lr = \frac{r_l - b_l}{b_l} \quad \text{EQ. 32}$$

The ratio informs how much more a player loses than the average amount a casino holds. The larger the ratio value is, the more a player relatively lost. Ratio values can then be sorted and the players with top quantile of ratio values can be marked unlucky players of the day.

In some embodiments, all players' last 5 visits to the casino can be collected. If players have more than 3 times of unlucky experiences during the last 5 visits, the casino can be alerted. Based on the alert suitable marketing or player retention action items can be executed.

Figure 21:
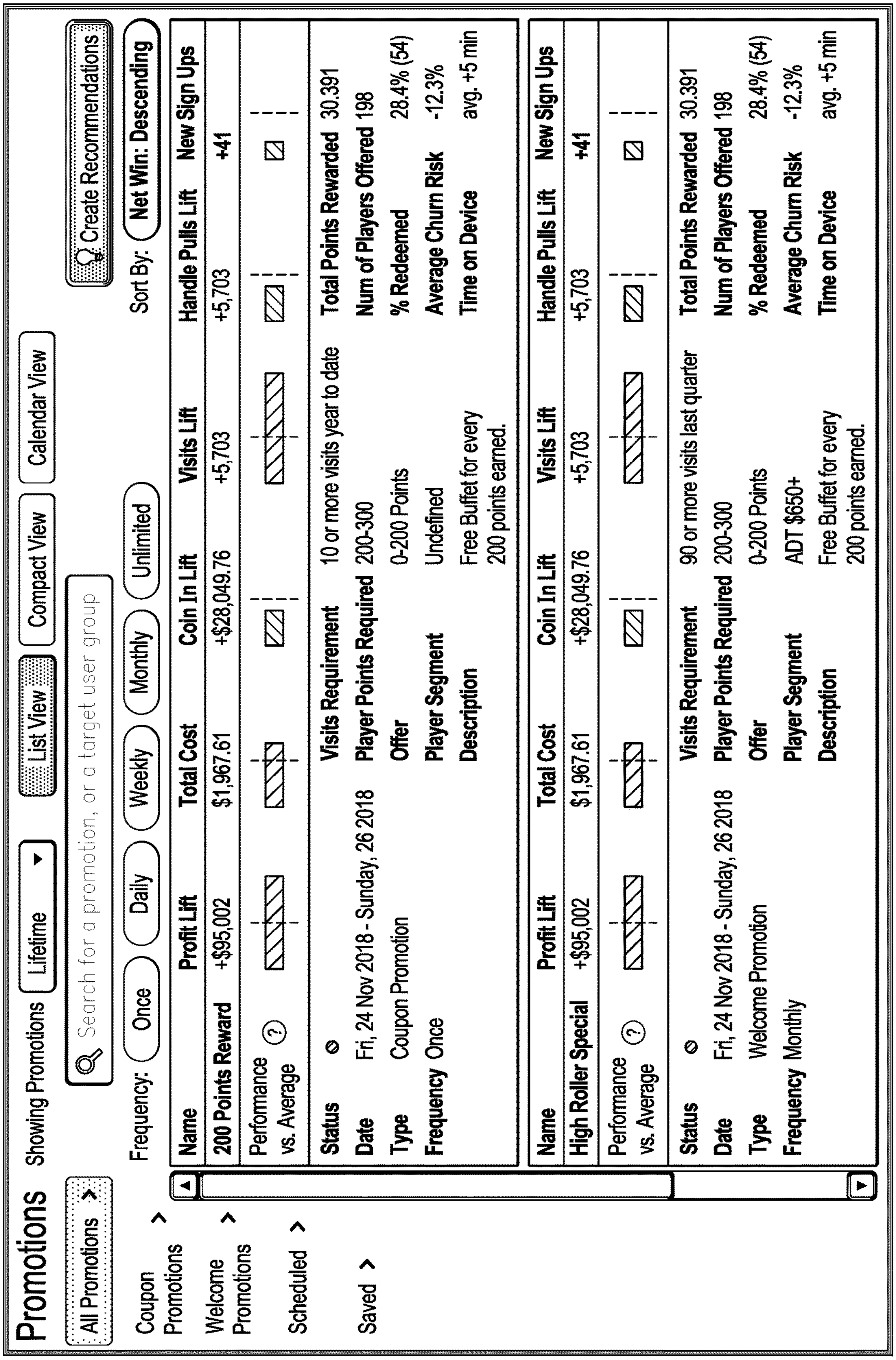
FIG. 21 depicts an example interface presenting player promotions/campaigns in accordance with one non-limiting embodiment.

The final part of an example Player Lifecycle Management pipeline can be to analyze various player metrics and data points collected through the previous steps and present actionable recommendations to the casino. In some embodiments, The Promotion module of the platform provides promotion recommendations to casinos. FIG. 21 depicts an example interface presenting player promotions/campaigns.

The platform workflow can starts with a goal-based approach to narrow down on the right mix of input metrics (player attributes, visit patterns, past offer performance, current floor mix etc.) to analyze and provide optimum recommendations backed by strong data facts. An example workflow is as follows (1) define goal, (2) provide details, (3) make recommendations, and (4) schedule, each of which are described in more detail below.

Figure 22:
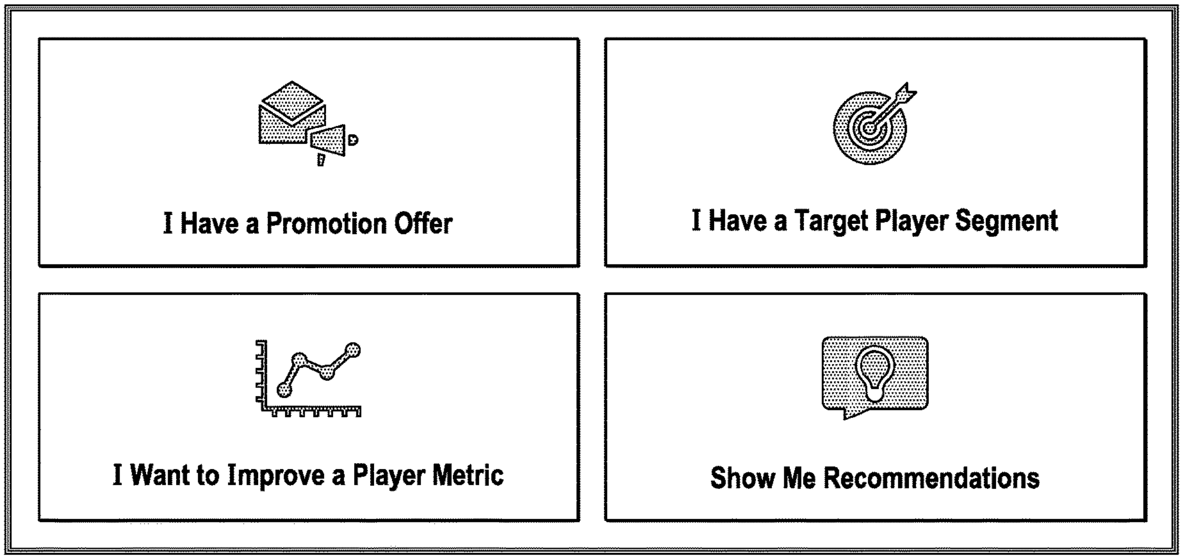
FIG. 22 depicts an example interface allowing a user to define promotional goals in accordance with one non-limiting embodiment.

Users of the system can first choose the goal that they want to achieve. Example goals include, but are not limited, getting player segment recommendations for a promotion or getting promotion recommendations to improve various player metrics. Example player metrics can be, for example, an increase of coin in, net win, visits etc., a reduction in player churn, a reduction of high-risk players, and/or a conversion of past loyal players to current players. FIG. 22 depicts an example interface allowing a user to define promotional goals.

Figure 23:
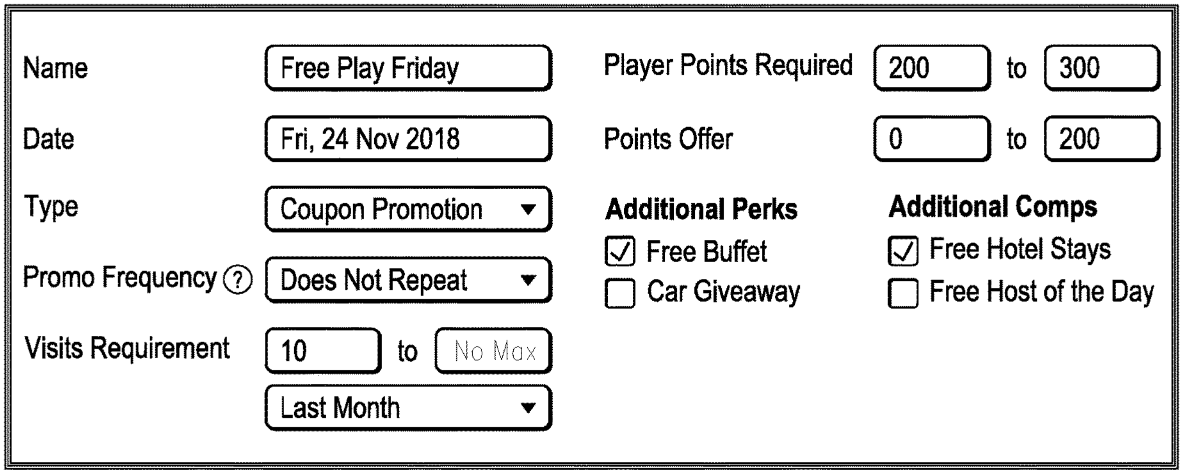
FIG. 23 depicts an example interface allowing a user to input promotion detail in accordance with one non-limiting embodiment.

Next, based on the goal defined by the user, the system can prompt the user to input some details. For example, if the user wants to know the optimum player segments to roll out a promotion, the promotion details are prompted. It may include, for example, the schedule, recurrence, eligibility criteria for players that can participate, offer value, and so forth. FIG. 23 depicts an example interface allowing a user to input promotion detail.

Next, the system can use the inputs/goals provided by the user as the starting point to determine the recommendation mix. The system can make recommendations based on the following approach.

Figure 24:
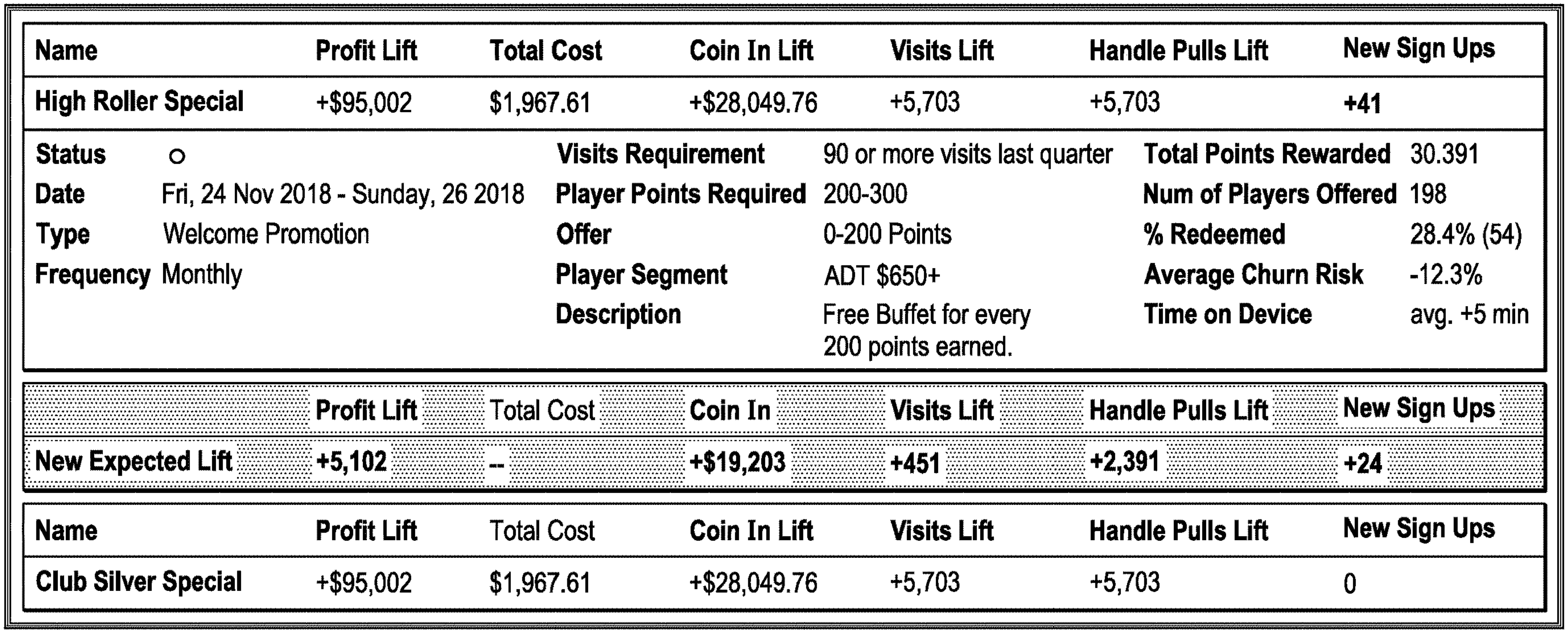
FIG. 24 depicts an example interface displaying promotion recommendations in accordance with one non-limiting embodiment.

The system can use past promotions performance metrics like promotion cost, expected vs actual ROI, profit, increase/decrease of Net Win/Coin In, number of visits before and after promotions, player movement/conversions before and after promotions etc., to determine how efficient promotions were their critical impact (e.g., increase in visits or coin in, increase in new player sign ups etc.). The system can then construct a data set using the effectiveness and impact for each promotion as the promotion's class, and the promotion's operating details such as type of promotion, equivalent dollar amount, target group, size of audience as features. This approach can be used to train a Random Forest Multi-classification model which can be used with future promotions to estimate their performance. As part of the recommendation, the system can include the projected impact (increase in Coin In, Visits, Profit, Game plays, New Player sign-ups, etc.) of running the promotion to help user to perform a cost-benefit analysis before rolling out the recommended promotion. FIG. 24 depicts an example interface displaying promotion recommendations.

Figure 25:
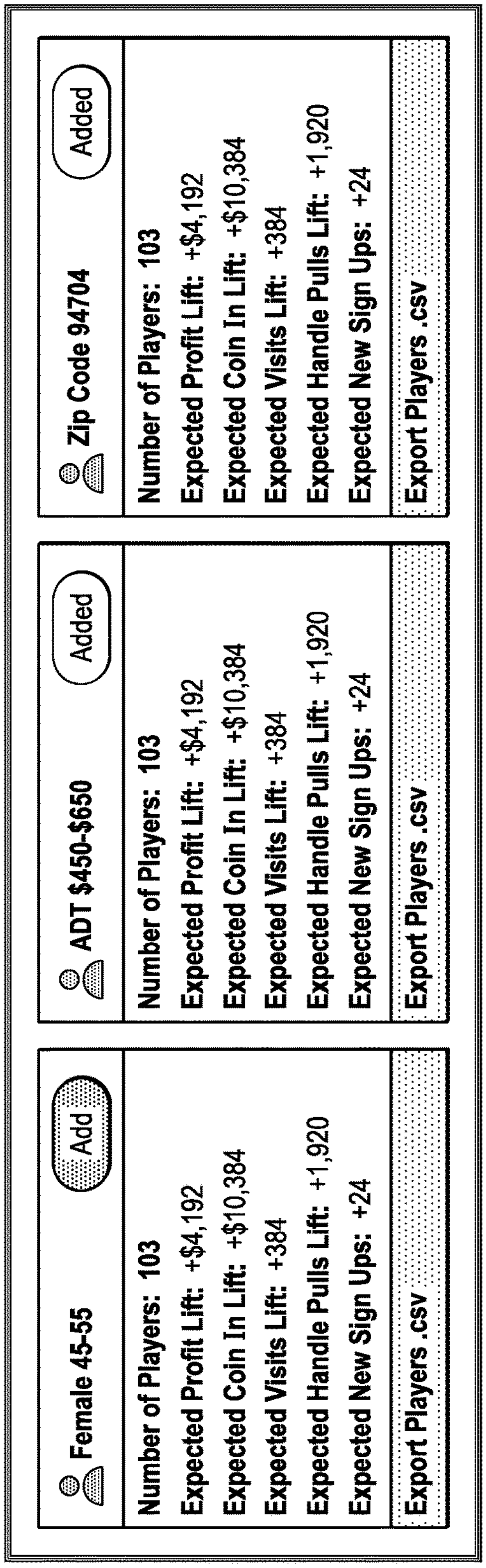
FIG. 25 depicts an example interface displaying example player segment recommendations in accordance with one non-limiting embodiment.

The system can use player attributes like participation, preferences, seasonality, sentiments, churn risk, RFM scores, constraints, Geo-location etc., to segment players into groups according to their similarities. Clustering algorithms, such as 'K-Means', uses the euclidean distance between data points to demonstrate similarities. By applying clustering algorithm to player attributes, it allows more logical segmentation where latent features can be discovered. FIG. 25 depicts an example interface displaying example player segment recommendations.

A promotion player mix analysis can be performed, as players' reactions to different types of promotions varies. Promotions also affects players in different ways. The system can be set up a ranking systems where each player has a list of most to least favorite promotions, and each promotion has a list of most to least effective target players. In some embodiments, a 'Stable Marriage' algorithm takes the rankings from both sides and matches each player with a preferred and effective promotion, and avoids casino loss by handing out multiple promotions to one player.

Figure 26:
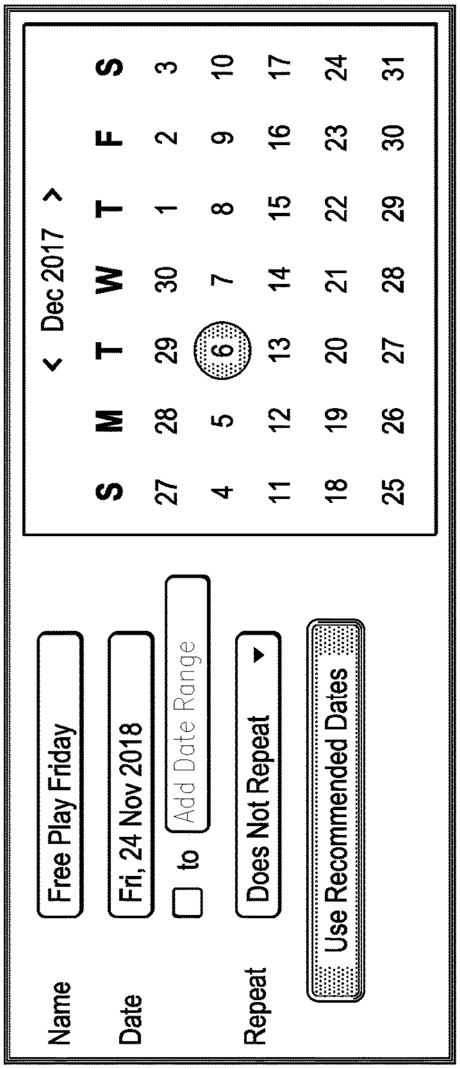
FIG. 26 depicts an example interface displaying example promotion schedule recommendations in accordance with one non-limiting embodiment.

Timing can be extremely critical for success of any marketing event. The system can recommend the best schedule to run a promotion, which can include when a promotion can run (date) and also a frequency (recurrence) to run within a given time window. Player participation/contribution, seasonality, impact of external events (festive holidays, shutdowns) etc., can be considered to determine the right schedule for promotions. FIG. 26 depicts an example interface displaying an example promotion schedule recommendation.

Referring now to anomaly analysis, the ability to identify and explain anomalies allows the casino operations to react faster to potential problems. Anomaly analysis in accordance with the present disclosure can assist the casino to forecast trends, detect anomalies, and explain the oddities.

The presently disclosed system can include a day series anomaly detection module. A goal of this module is to assign anomaly scores to values in a day series. The assumption is that observations vary in accordance with a yearly seasonal period. In some embodiments, it is most sensible to compare a particular observation against those which best represent what is normal in the same approximate portion of the seasonal period. The following procedure describes an example way to pool together the appropriate samples from a day series, taking into account yearly and weekly seasonality, and use them to train an unsupervised anomaly detection model.

First, seasonality-aware sampling can be performed. Given $(d_i, v_i)$ in a series of s of date and value pairs, samples from the population are needed to determine if the value v of a given date $d_i$ is anomalous. The most recent notion of normality is best represented by the values of the same day-of-week as $d_i$ in the same yearly season. The sample pool can be started by adding same day of week date and value pairs of previous weeks from the current year. For previous years, it is common that the exact same date as $d_i$ does not fall on the same day of the week. As such, the module can look into the closest date to $d_i$ that is the same day of the week to pool the samples. In some embodiments, sampling can go back years until a sample size of at least 20 is reached. Next, the sampling can be cleaned by eliminating the outliers in the sample set from last step to make sure the samples could represent the normal seasonality trend of $d_i$. Then, anomaly detection can be performed using, for example, Sci-Kit Learn's IsolationForest or LocalOutlierFactor to train on sample data, and compute the anomaly score of the $v_i$.

It is noted that depending on the structure of the target data, generating an anomaly score for a whole series of values could be achieved by iterating the above approach. Additionally, an anomaly score does not necessarily tell if a value is an anomaly without setting up one or several threshold(s), as the threshold is the value which defines anomalies. Several thresholds can be defined, such as discretizing anomaly scores into bins or tiers and then segmenting anomalies into class 1, class 2, class 3 and so on, depending on the severity of their anomaly scores.

A plethora of algorithms exist for forecasting seasonal time-series, but there is little consensus as to which yields the best accuracy when it comes to forecasting day-series with seasonality. In accordance with the present embodiment the Prophet and HoltWinters algorithms, although they are very different in nature, can be used in tandem in accordance with the present disclosure to yield better results than either method alone.

The term additional regressor is an option in the implementation of the Prophet algorithm that allows the user to provide an exogenous array of values into the model. This data is then standardized internally and allowed to influence Prophet's prediction via either an additive or multiplicative function. A finer level of detail on the stages are described below.

First, a data preparation step can generate a day series, which strongly correlates with a target metric, and whose future values along time are predicted with the HoltWinters Ensemble procedure, in order to be used as an additional regressor in Prophet. By way of example, suppose the future 365 days of coinIn for a given stand is the predicting target. An array M can be defined as a day series of coinIn values spanning more than 3 years, for a total length of $n \geq 365 \times 3 \geq 1095$. Each point $m_i$ here represents the value of coinIn which went inside the asset placed on the given stand on each day. For any day series metric M along the data hierarchy, there might exist related metrics with the potential to add valuable information into the ensemble. Related metrics S to M in this case might be the coinIn, handlePulls and netWin of the same stand as well as the neighboring stands in the same bank. Additionally, heavier weights can be assigned to those variables in S that have higher correlation with M. Python pandas DataFrame.ewm function can be used to manipulate and calculate the proper weights.

An additional regressor can be created by producing a forecast of the same length as that intended to be obtained from Prophet, and appending the forecast values to a processed version of the existing array. The processing involved pertains mostly to handling outliers. The forecast values are appended to the processed version and not the original ewa_corr because Prophet will ultimately learn from this data in tandem with M, which will go through the same process eventually.

The data can be cleaned by the following steps. First, closures by day of week can be interpolated. Zeros represent days of non-operation, as they do not assist with predictions and can rather distort them. Next anomaly detection and interpolation can be performed. As is to be appreciated, several anomaly detection tools are available for time series data, such as the Luminol open source module Luminol. For the purposes of deploying this at scale, a method of determining the anomaly threshold may be required as using the default threshold may lead to an exaggerated amount of anomalies in real-world data. In an alternative embodiment, an adaptive function can be used that will determine a threshold based on the average anomaly score of the data. For example, the threshold anomaly score can be set to 4 standard deviations away from the mean anomaly score. Points with anomaly scores greater than this threshold will be assumed to be anomalies. From there, anomalies by day of week can be interpolated. As a final step in an example data cleaning process, the values in the series can be limited to ensure that no outliers managed to pass through the detector and may distort forecasts. This can be accomplished, for example, by limiting the values of our series (i.e., to twice its 6 month rolling average).

After the cleaning from the previous steps, the data can be ready for forecasting the processed version of ewa_corr. The process of Ensemble can be applied on top of the best combination of parameters discovered by Grid Search. This grid search process not only finds the best parameters, but also creates an ensemble of forecasts. In accordance with the present disclosure, the implementation of the Holt Winters algorithm described below can reproduce this research.

First, the best parameter combinations can be found. For the data of each day of the week, an optimal number of validation sets can be determined, along with their boundaries, and then can be fit to a Holt Winters model for every categorical parameter combination possible. The parameter combos of each validation year can be ranked by their RMSE, and a weighted average rank can be computed for each parameter combo which weights the most recent sets more heavily. A similar grid search can be repeated focusing on the continuous parameters, and arrive at the best continuous parameter combinations.

With the best categorical and continuous parameter combinations identified, the top N categorical combinations and the single best continuous combination can be used to train a HoltWinters model for each categorical combo, but this time fitting in all the training data of a particular day of week. As a result, one forecast array is developed for each top categorical combination. These arrays can then be combined into a single array by doing an exponentially weighted average skewed toward the top-ranking combos. Finally, there will be one forecast array for each day of the week, which can be sorted by date. After this is done, the future of the additional regressor has been forecasted.

Next, the forecast sorted by date is appended to the cleaned version of ewa_corr series. One point per day can be recorded spanning uninterruptedly from the beginning of the observations, all the way to the last point of the forecasted future. The additional regressor is then ready. To fit in Prophet, M can be cleaned following the same procedure as described above. Then fit a Prophet model and include the additional regressor. Some additions can include setting country holidays with Prophet, as well as including special events. This result should have a lower RMSE as compared with the Prophet algorithm without the additional regressor and should also have a more dynamic inter-day variation if compared to Prophet's prediction.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

We claim:

1. A computer system including a processor and a memory, the memory containing software instructions configuring the system to perform acts including:

receive player data for each of a plurality of players registered with a casino, wherein the player data is recorded and monitored periodically or in real-time;

aggregate and store the player data for each of the plurality of players;

determine a player status classification for each of the plurality of players, wherein the player status classification is based on past and current casino visits;

determine a churn status for each of the plurality of players, wherein the churn status is based on a visit pattern for each of the plurality of players, wherein the visit pattern is based on a number of visits to the casino, gaming activity at the casino, and an amount of time between each of the visits;

train a model with a training data set comprising labeled data;

subsequent to determining the churn status for each of the plurality of players, predicting a risk of churning for each of the plurality of players based on the model trained with the training data set comprising labeled data;

determine a lifetime value prediction for each of the plurality of players using a neural network model that considers casino visit patterns and player data, wherein the lifetime value prediction predicts a player frequency, value at risk (VAR) and net win value for a period of time for each of the plurality of players; and cause to be displayed on an interface a recommendation for a casino promotion, wherein the recommendation is based on a goal definition received by a user, wherein the recommendation for the casino promotion is based on past promotion performance metrics, wherein the recommendation for the casino promotion is based on the determination of player status classifications, risks of churning, lifetime value predictions, and any of historical player data and real-time player data.

2. The computer system of claim 1, wherein the player status classification comprises one or more of a new player status, an inactive player status, and an active player status.

3. The computer system of claim 1, wherein the player status classification comprise one or more of a churned player status and a high risk churn status.

4. The computer system of claim 1, wherein the player data comprises one or more player metrics based on gameplay.

5. The computer system of claim 4, wherein the player metrics comprise any of coin in, net win, and theoretical win.

6. The computer system of claim 5, wherein the player metrics comprise any of number of sessions, average time spent at gaming machines, promotional coin in, and average intervisit duration.

7. The computer system of claim 1, wherein the player data comprises data for each of coin in, net win, and theoretical win.

8. The computer system of claim 1, wherein the player data further comprises data for each of number of sessions, average time spent at gaming machines, promotional coin in, and average intervisit duration, and player attributes, wherein player attributes comprise player club level and player demographic data.

9. The computer system of claim 1, wherein the training data set comprises training features, wherein the training features comprise any of demographic information, visiting patterns, and aggregation of player gaming statistics, distance to casino, number of handle pulls/game plays, games won, games lost, jackpots, game titles, gaming machine model, denomination, and average bet.

10. The computer system of claim 1, wherein the training data set comprises training features, wherein the training features comprise demographic information, visiting patterns, and aggregation of player gaming statistics.

11. A method, comprising:

receiving, by a gaming machine analytics computing system, player data for each of a plurality of players registered with a casino;

aggregating and storing, by the gaming machine analytics computing system, the player data for each of the plurality of players;

determining, by the gaming machine analytics computing system, a player status classification for each of the plurality of players, wherein the player status classification is based on past and current casino visits;

determining, by the gaming machine analytics computing system, a churn status for each of the plurality of players, wherein the churn status is based on a visit pattern for each of the plurality of players, wherein the visit pattern is based on a number of visits to the casino and an amount of time between each of the visits;

training a model with a training data set comprising labeled data;

subsequent to determining the churn status for each of the plurality of players, predicting, by the gaming machine analytics computing system, a risk of churning for each of the plurality of players based on the model trained with the training data set comprising labeled data;

determining, by the gaming machine analytics computing system, a lifetime value prediction for each of the plurality of players using a neural network model that considers casino visit patterns and player data, wherein the lifetime value prediction predicts a player frequency, value at risk (VAR) and net win value for a period of time for each of the plurality of players; and displaying, by the gaming machine analytics computing system, on an interface, a recommendation for a casino promotion, wherein the recommendation is based on a goal definition received by a user, wherein the recommendation for the casino promotion is based on past promotion performance metrics, wherein the recommendation for the casino promotion is based on the determination of player status classifications, risks of churning, and lifetime value predictions.

12. The method of claim 11, wherein the player status classification comprises one or more of a new player status, an inactive player status, and an active player status.

13. The method of claim 11, wherein the player status classification comprise one or more of a churned player status and a high risk churn status.

14. The method of claim 11, wherein the player data comprises one or more player metrics based on gameplay.

15. The method of claim 14, wherein the player metrics comprise any of coin in, net win, and theoretical win.

16. The method of claim 15, wherein the player metrics comprise any of number of sessions, average time spent at gaming machines, promotional coin in, and average intervisit duration.

17. The method of claim 11, wherein the player data comprises data for each of coin in, net win, and theoretical win.

18. The method of claim 11, wherein the player data further comprises data for each of number of sessions, average time spent at gaming machines, promotional coin in, and average intervisit duration.

19. The method of claim 11, wherein the training data set comprises training features, wherein the training features comprise any of demographic information, visiting patterns, and aggregation of player gaming statistics.

20. The method of claim 11, wherein the player data is received periodically or in real-time.

* * * * *